Figure 1:
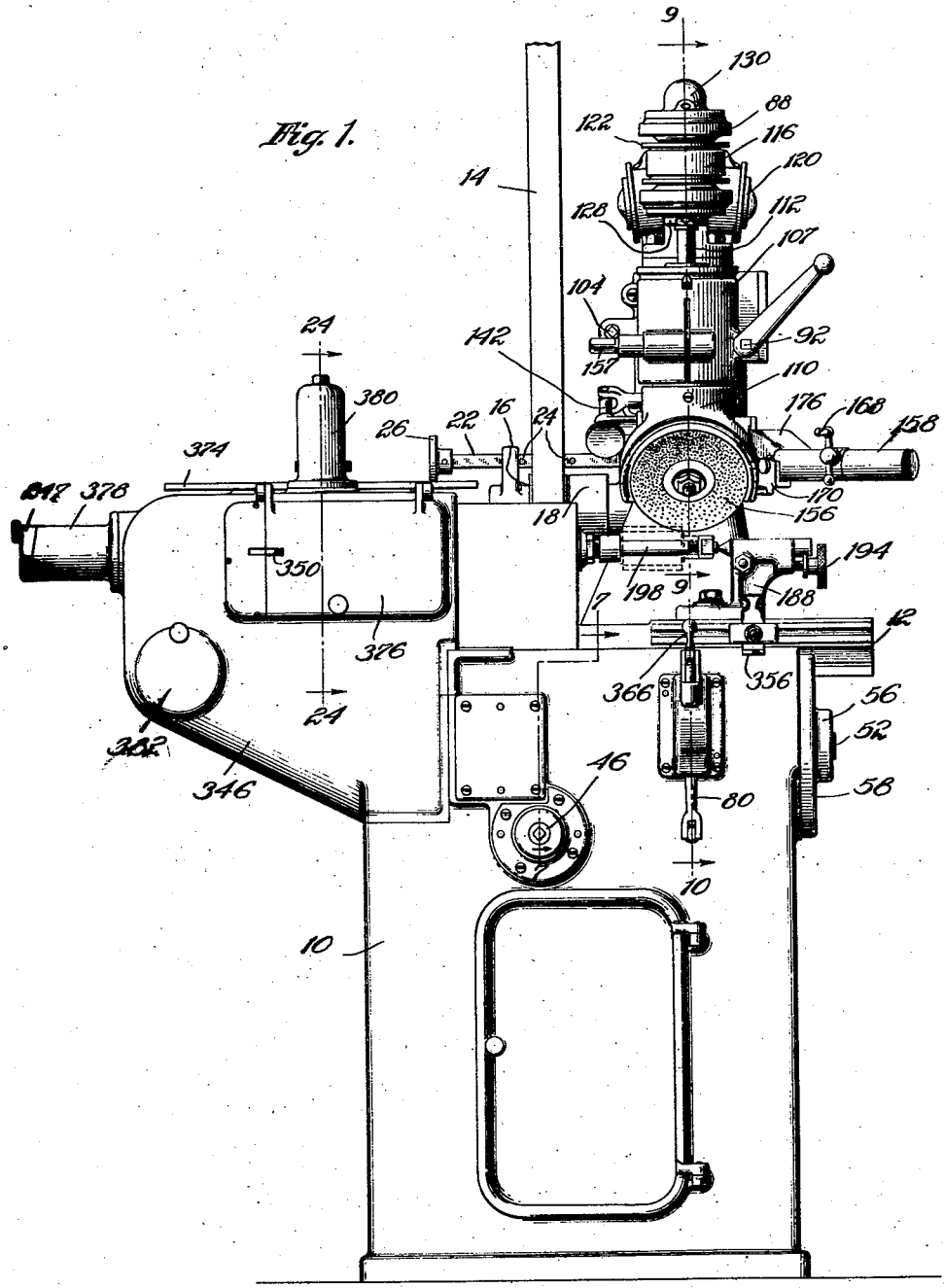

Feb. 22, 1927.

J. B. SINDERSON

CUTTER GRINDER

Filed Feb. 25, 1921    22 Sheets-Sheet 5

1,618,680

Inventor:
John B. Sinderson
By Miller Chindahl & Parker
Attys.

Feb. 22, 1927. 1,618,680
J. B. SINDERSON
CUTTER GRINDER
Filed Feb. 25, 1921 22 Sheets-Sheet 6

Inventor:
John B. Sinderson
By Miller Churchdahl & Parker
Attys.

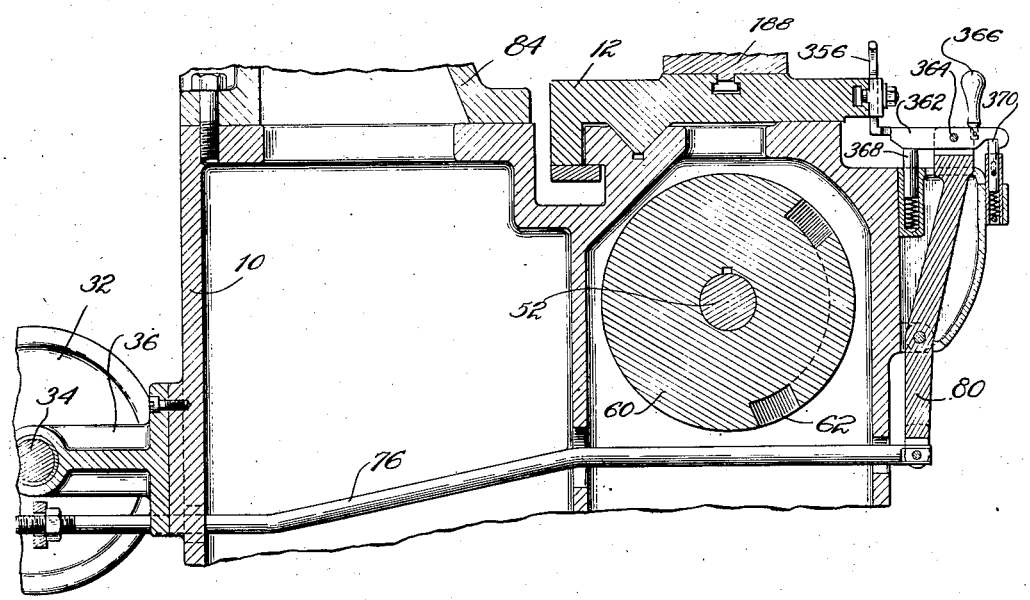

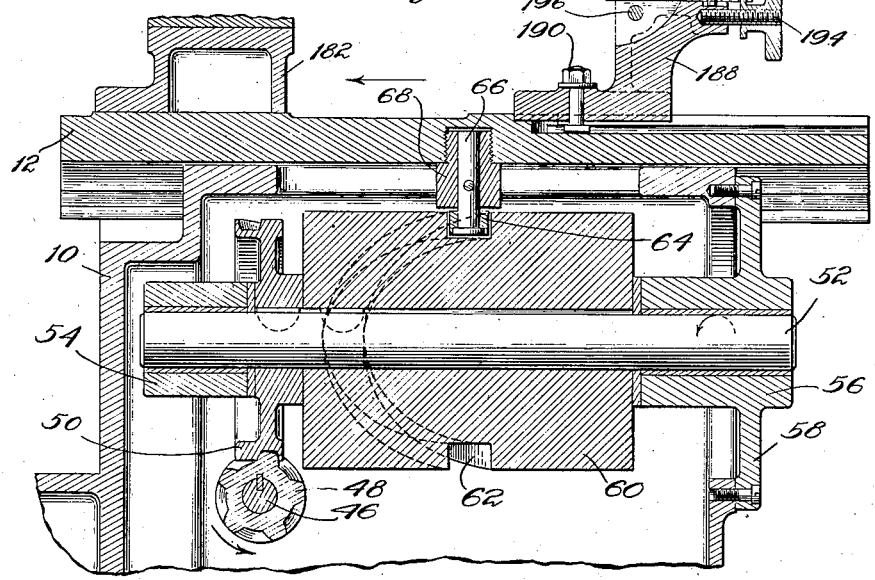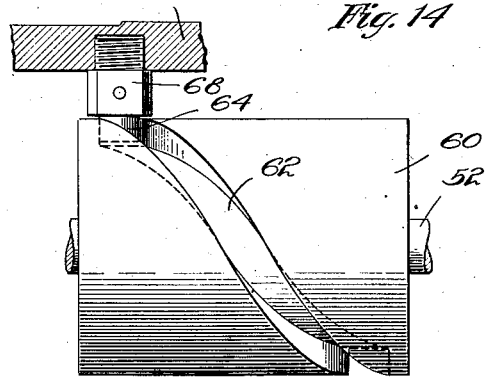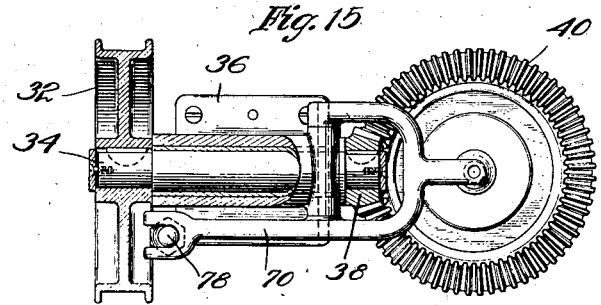

Feb. 22, 1927.
J. B. SINDERSON
1,618,680
CUTTER GRINDER
Filed Feb. 25, 1921 22 Sheets-Sheet 9
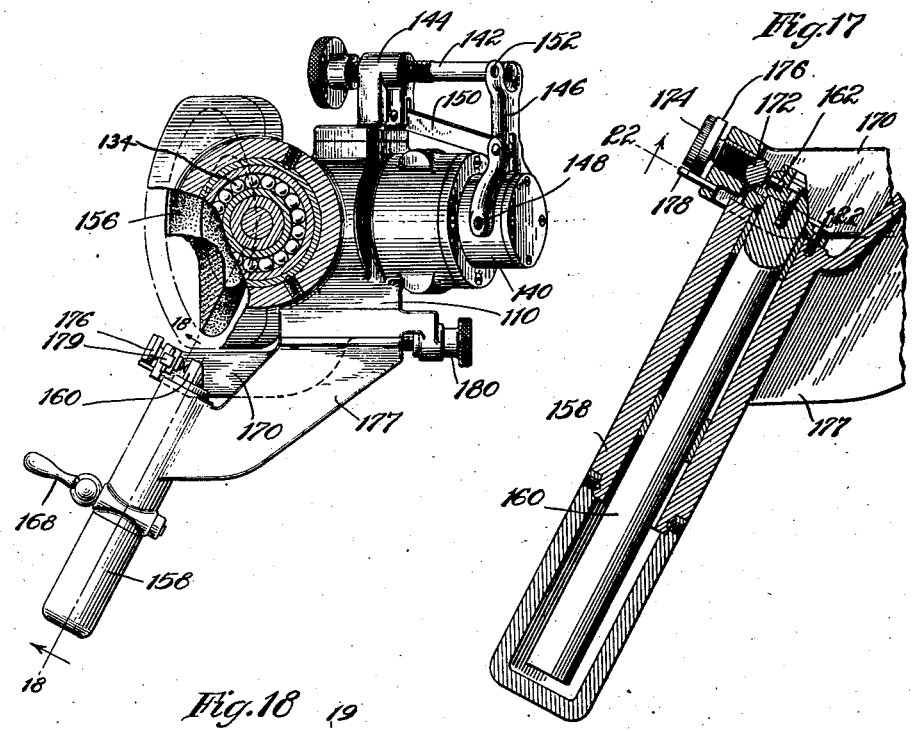
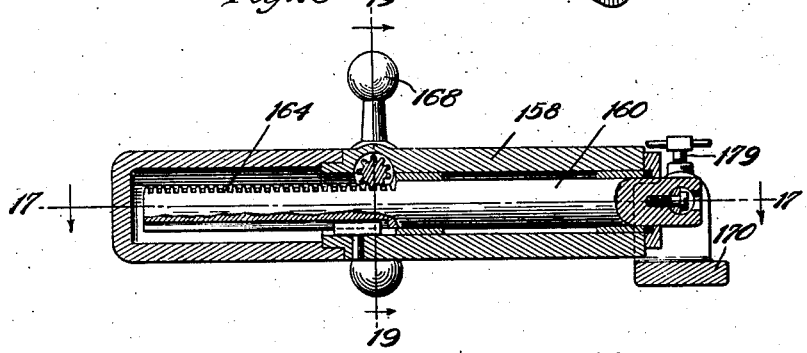
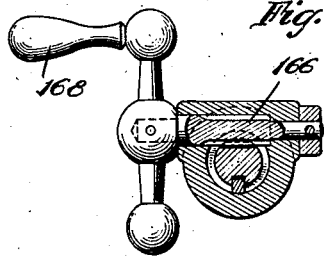
Inventor:
John B. Sinderson Feb. 22, 1927.
J. B. SINDERSON
1,618,680
CUTTER GRINDER
Filed Feb. 25, 1921
22 Sheets-Sheet 10
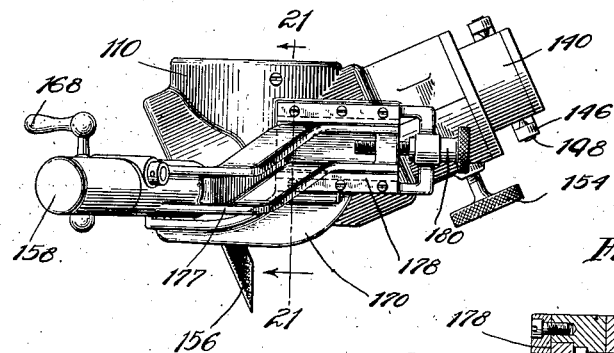
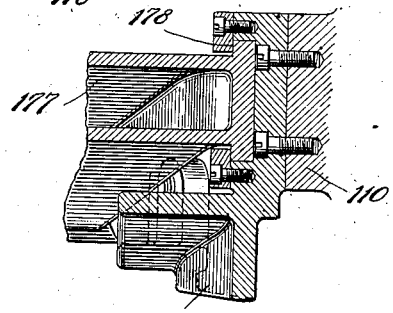
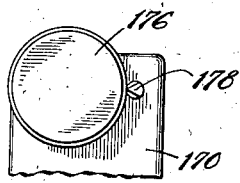
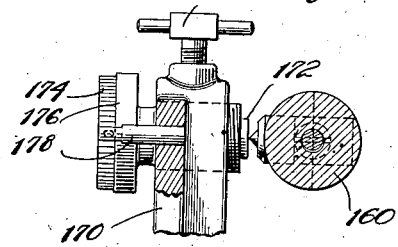
Inventor:-
John B. Sinderson
By Miller Chindahl & Parker
Attys.

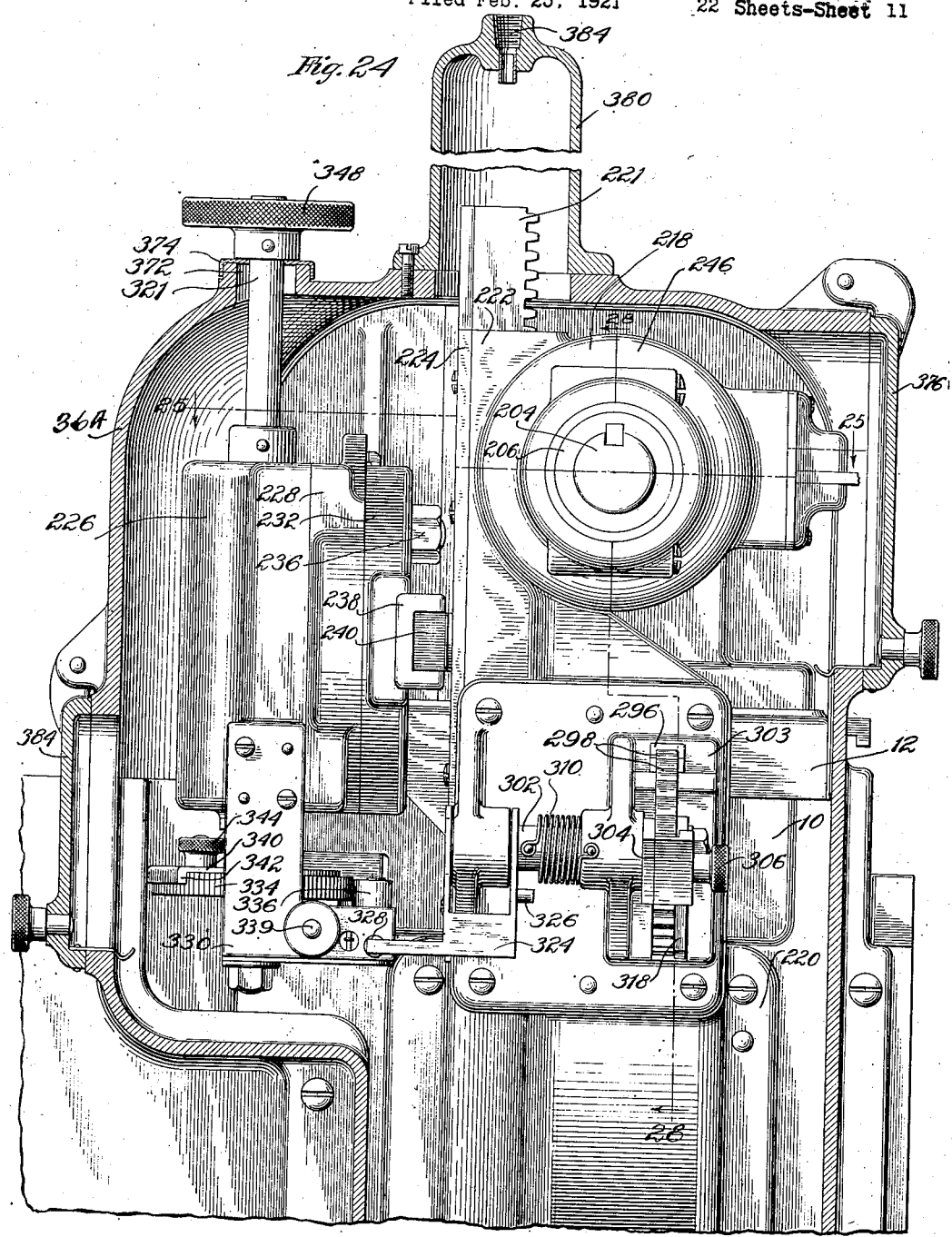

Feb. 22, 1927.  
J. B. SINDERSON  
CUTTER GRINDER  
Filed Feb. 25, 1921  
1,618,680  
22 Sheets-Sheet 12
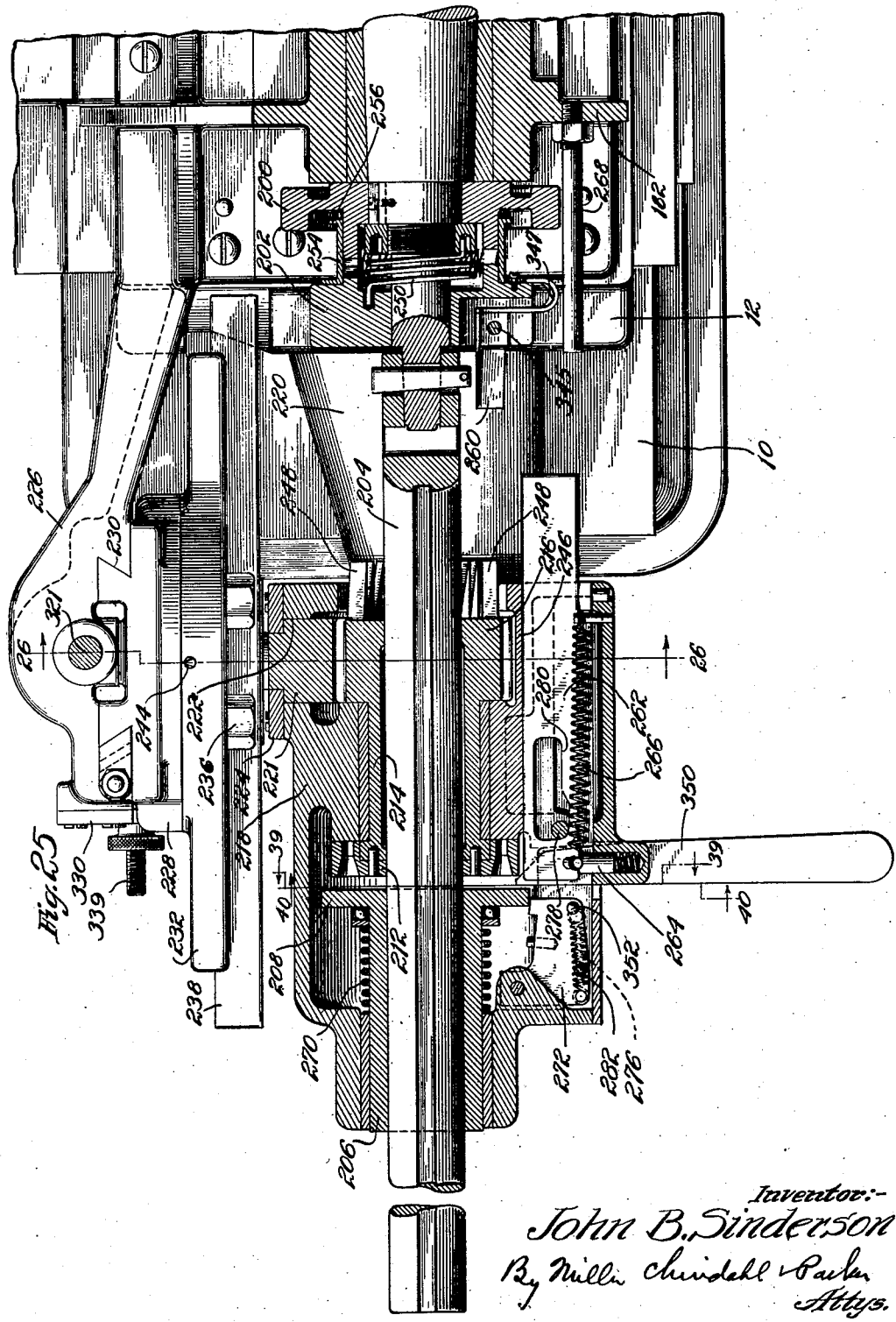
Inventor:-  
John B. Sinderson  
By Miller Chindahl Parker  
Attys.

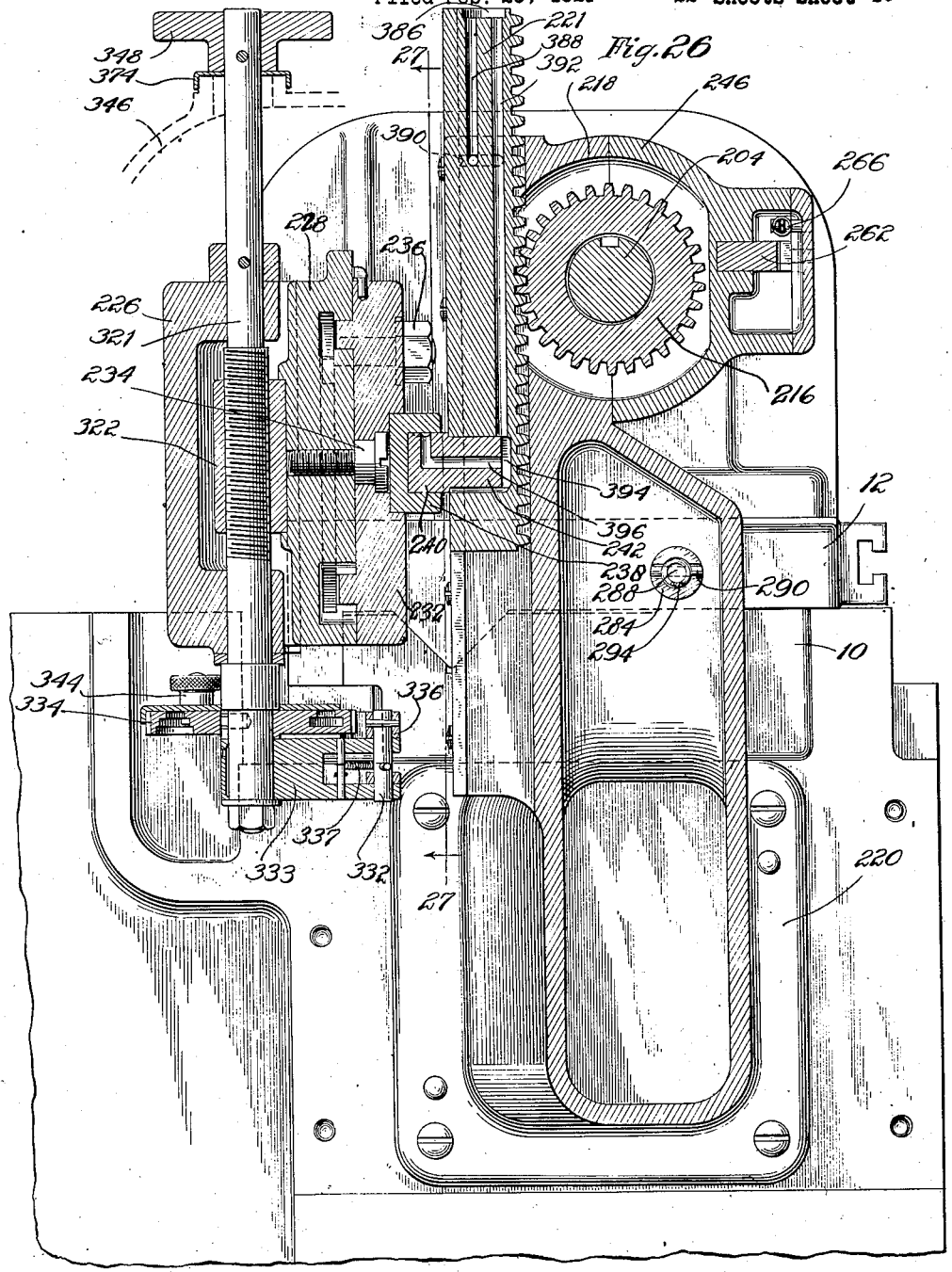

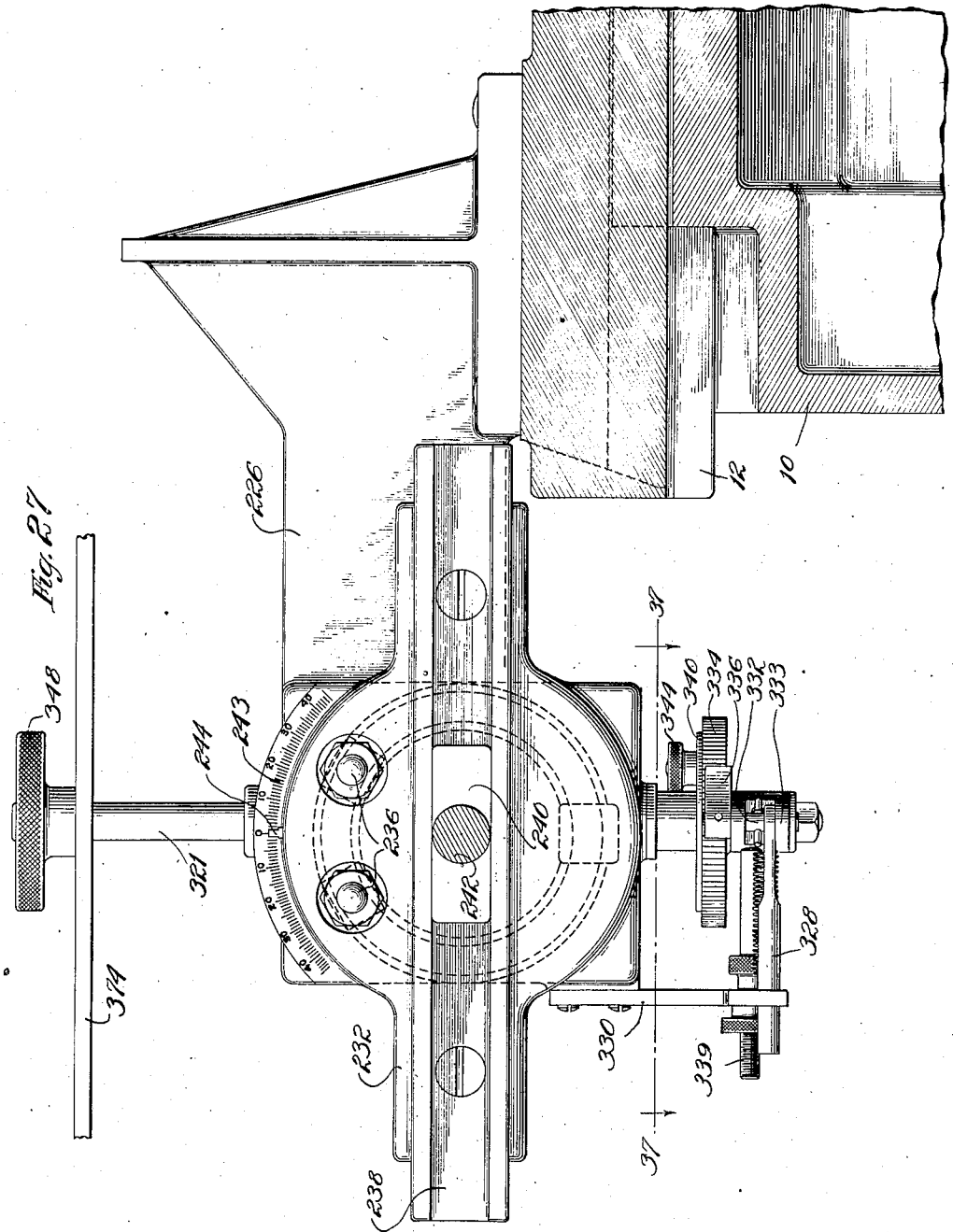

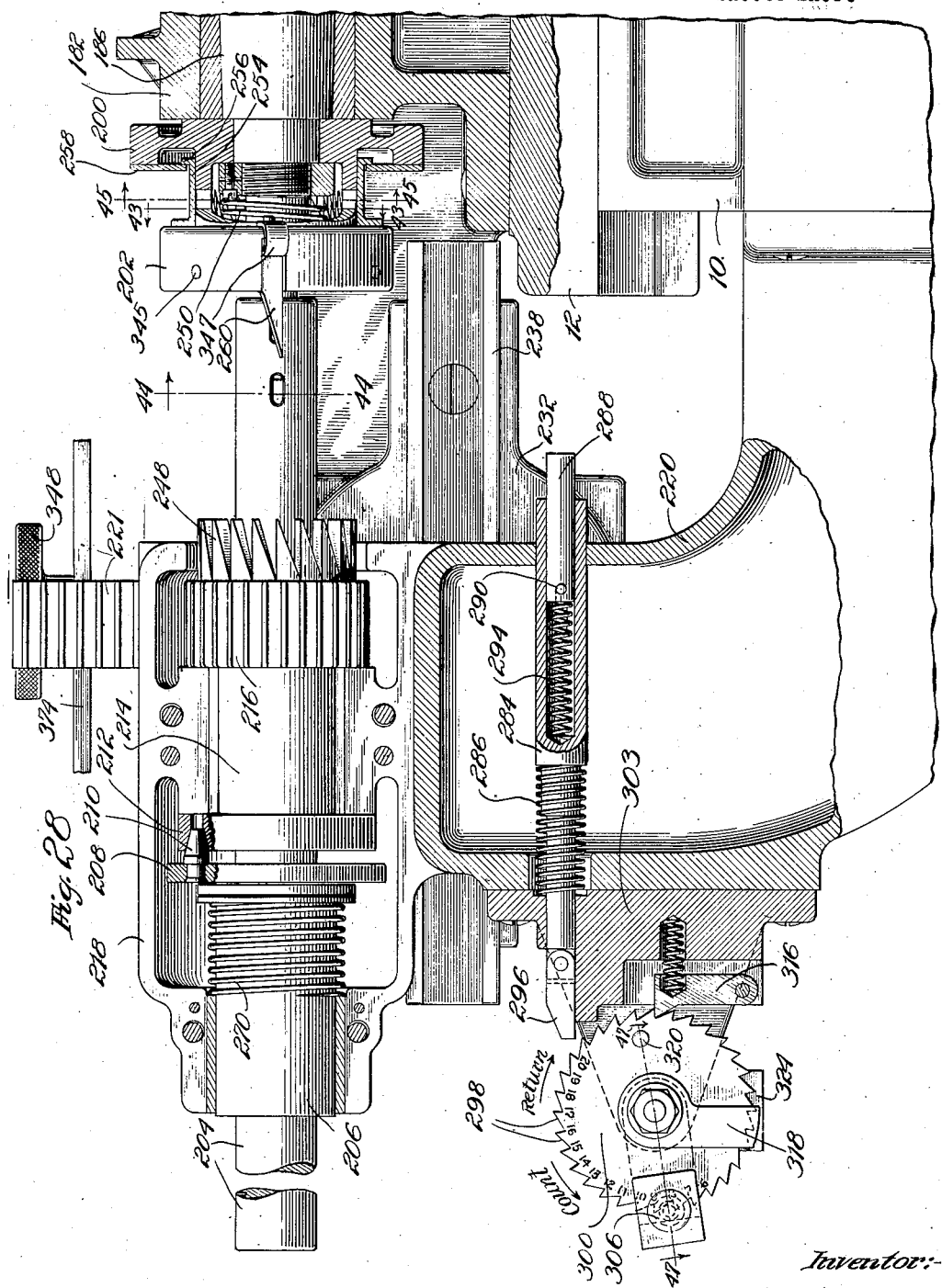

Feb. 22, 1927. 1,618,680
J. B. SINDERSON
CUTTER GRINDER
Filed Feb. 25, 1921 22 Sheets-Sheet 16
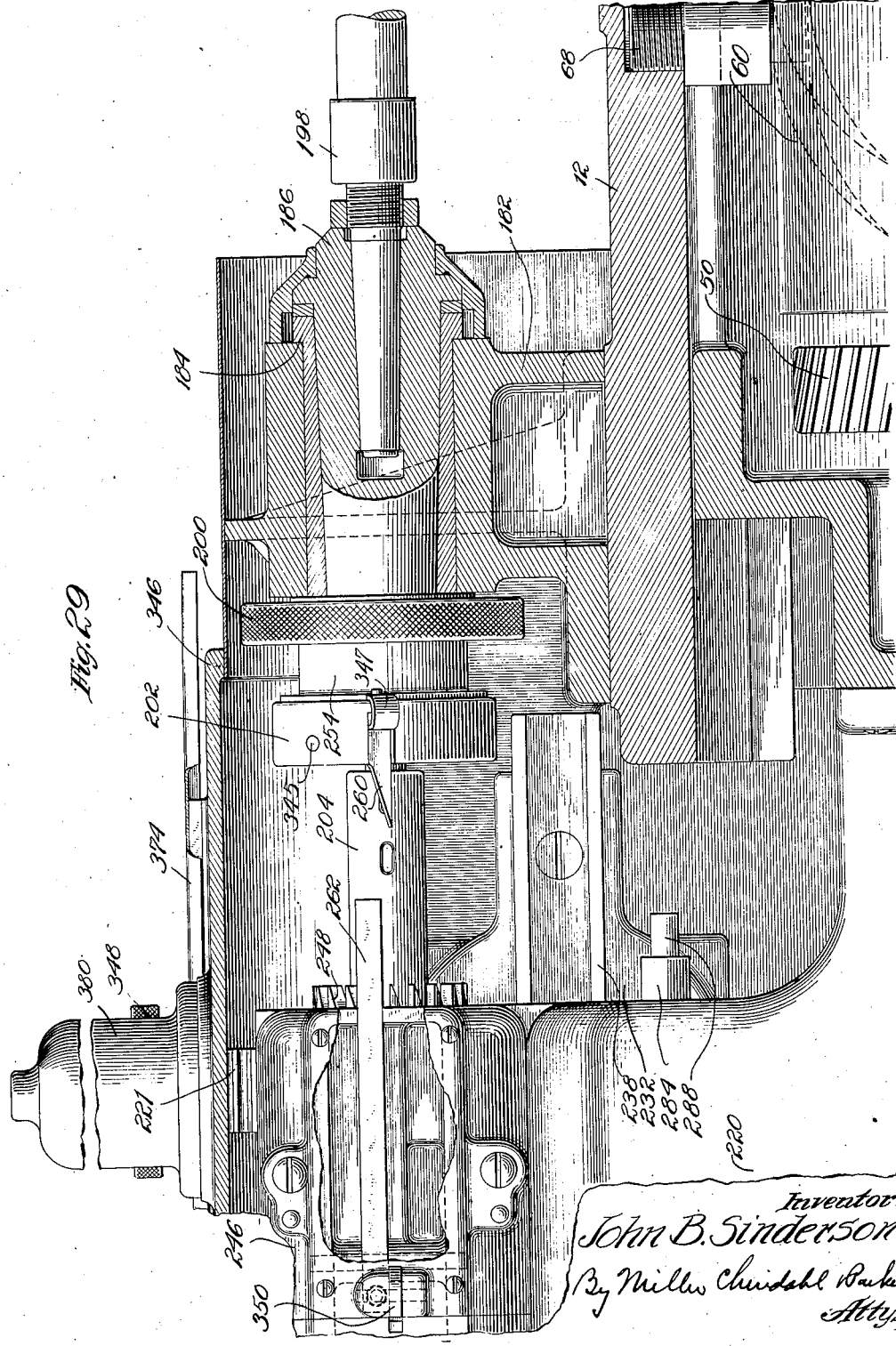

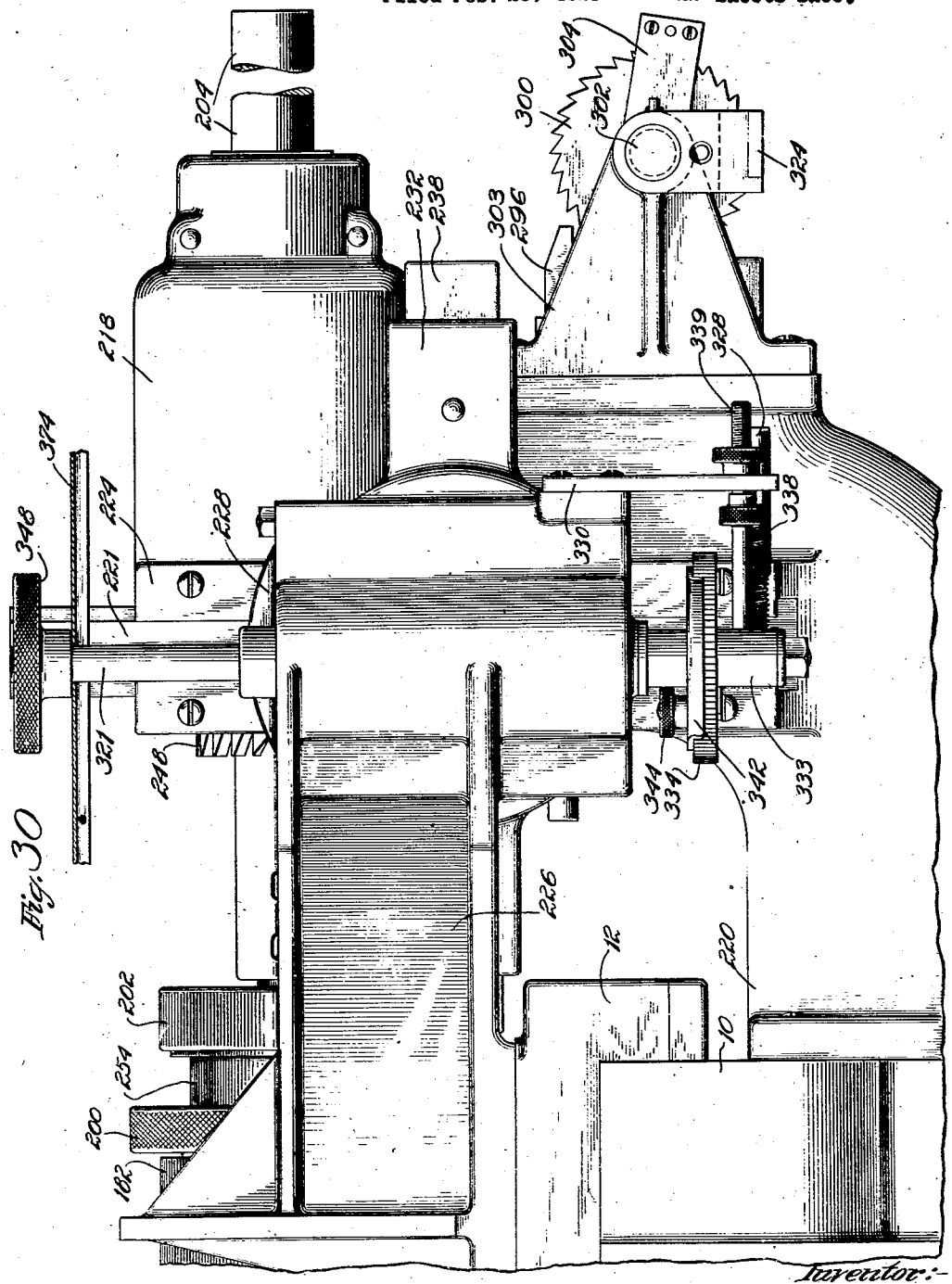

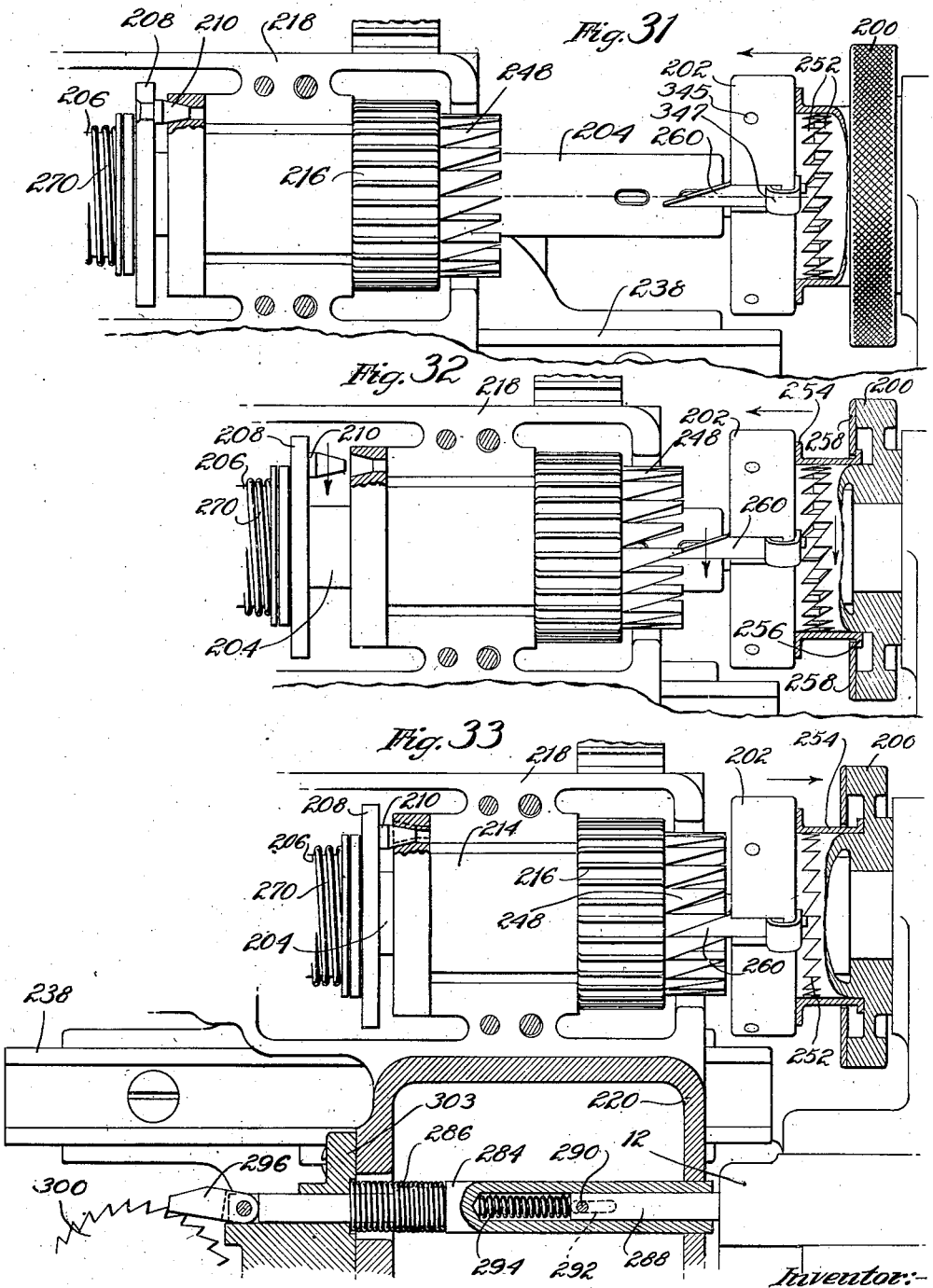

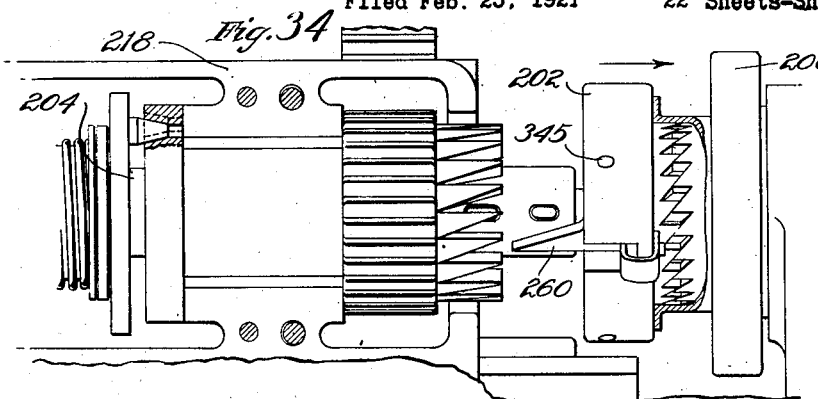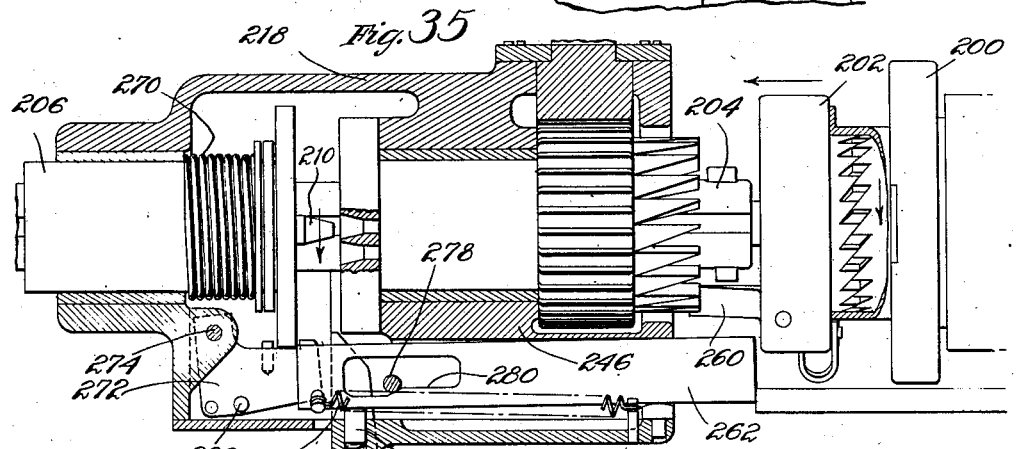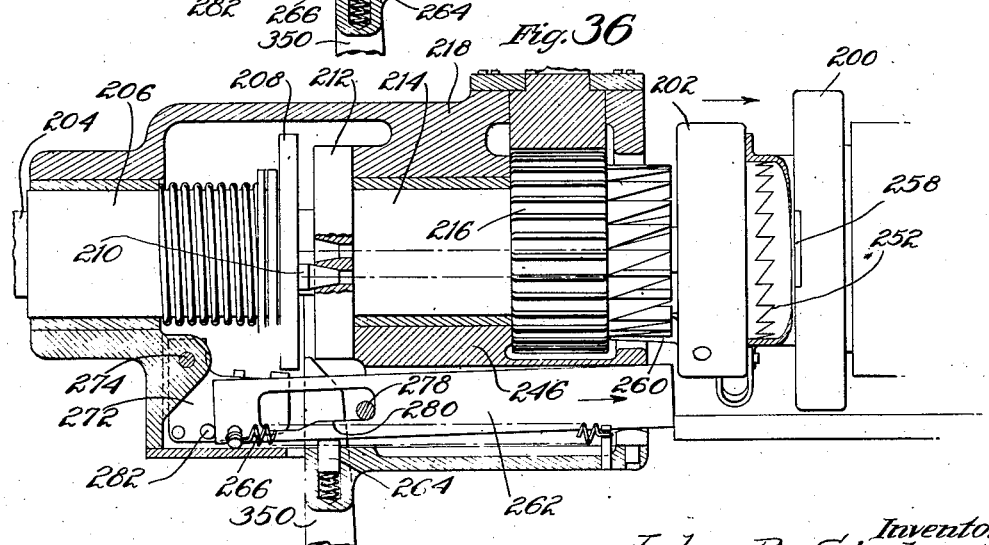

Feb. 22, 1927.
J. B. SINDERSON
CUTTER GRINDER
Filed Feb. 25, 1921

1,618,680

22 Sheets-Sheet 20

Bottom View

Inventor:-
John B. Sinderson
By Miller Chindahl Parker
Attys.

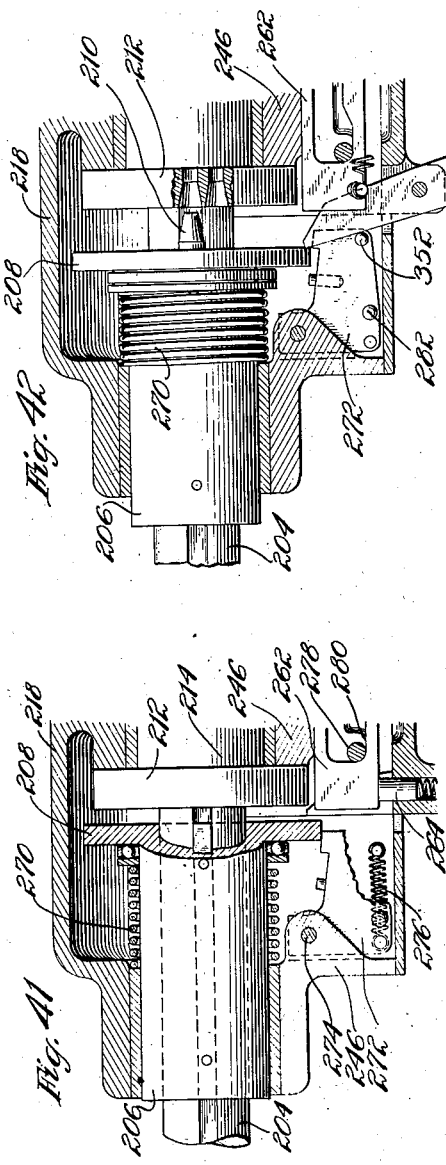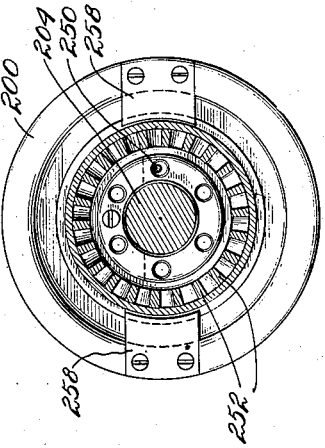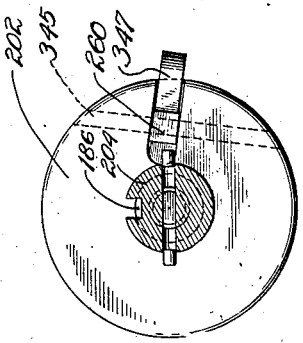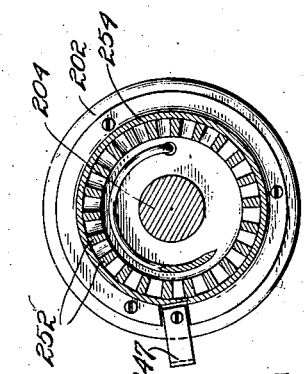

Feb. 22, 1927.  
J. B. SINDERSON  
CUTTER GRINDER  
Filed Feb. 25, 1921     22 Sheets-Sheet 22

1,618,680

Inventor:-
John B. Sinderson
By Miller Churchill Parker
Attys.

Patented Feb. 22, 1927

1,618,680

UNITED STATES PATENT OFFICE.

JOHN B. SINDERSON, OF ROCKFORD, ILLINOIS, ASSIGNOR, BY MESNE ASSIGNMENTS, TO BARBER-COLMAN COMPANY, OF ROCKFORD, ILLINOIS, A CORPORATION OF ILLINOIS.

CUTTER GRINDER.

Application filed February 25, 1921. Serial No. 447,811.

My invention relates to an improved automatic machine for sharpening or grinding the faces of the teeth of milling cutters. While my invention is especially useful for sharpening spirally gashed hobs, it is equally well adapted for similar work on straight-gashed hobs and on milling cutters of all sorts having either straight or spiral flutes or gashes.

One object of my invention is to provide an adjustment in the grinding wheel mounting for taking care of the lead or spiral angle of the gashes in the cutter by rotation about an axis parallel to and preferably coincident with the line of contact. Such an arrangement is advantageous in that the lead of the gash being known, it is only necessary to set the parts carrying the grinding wheel to the same angle, whereas if rotation about any other axis were made use of to effect such adjustment, the amount of rotation would not only not be the same as the angle of the gash, but it would not vary uniformly with changes in the lead.

Another object is to provide dressing means to dress the wheel correctly after it is positioned to operate at any lead angle and to cut either radial or offset tooth faces. In other words, the dressing device is arranged to dress the wheel in its final working position no matter what that may be, so that no adjustment is ever necessary after dressing the wheel and before performing the grinding operation.

Another object is to provide simple and reliable means easily adjusted to produce a spiral movement of the cutter at any desired lead angle.

Another object is to provide means for superposing on the means for producing spiral movement, an indexing movement, which indexing movement may be automatic or hand operated.

Another object is to provide means for automatically or manually superposing on the other movements of the work a feed to increase the depth of cut or take a new cut.

Another object is to provide means for automatically stopping the automatic feed after any predetermined amount of feeding movement has taken place.

Another object is to assemble all the means for controlling the movement of the work where they will be effectively protected from dirt and yet readily accessible for adjustment or repair.

Further objects and advantages of my invention will become apparent as the description proceeds.

Figure 2:
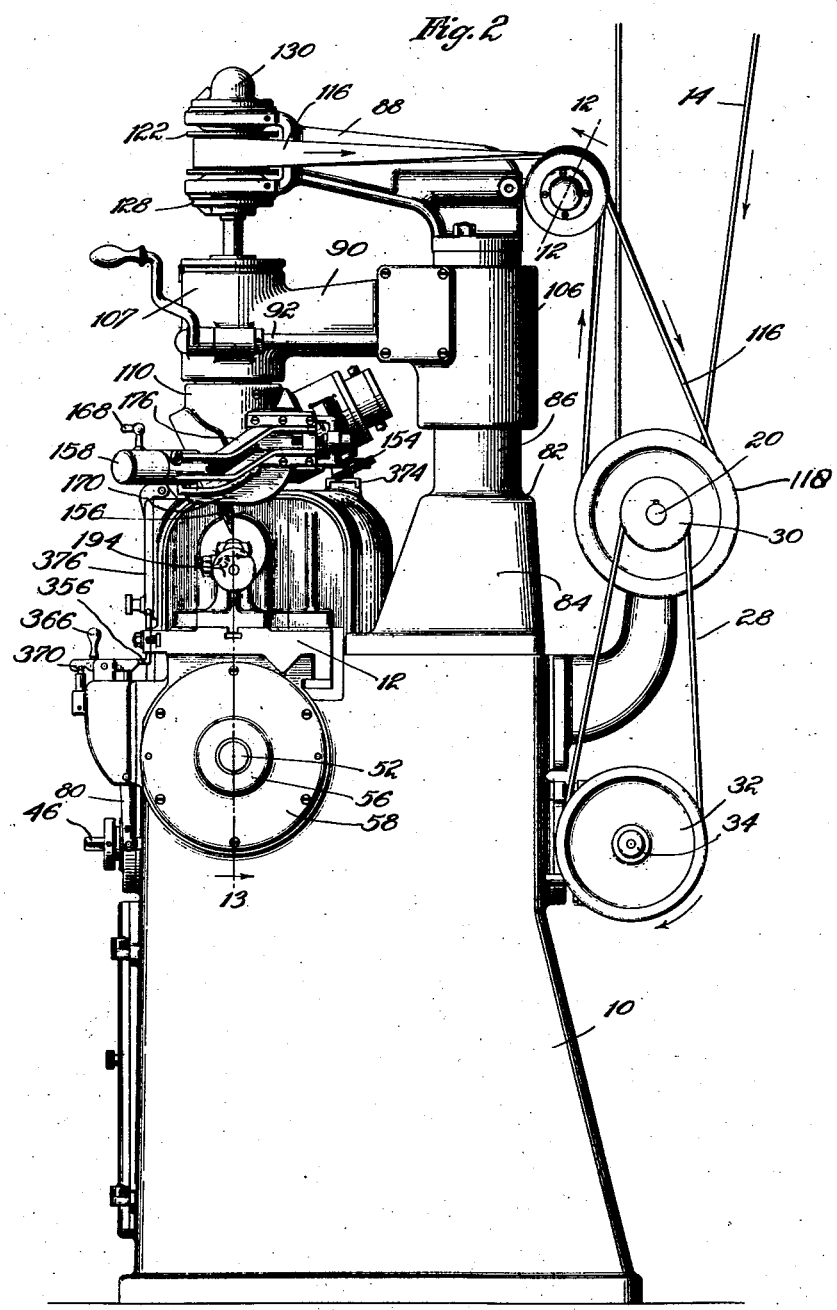
Figure 3:
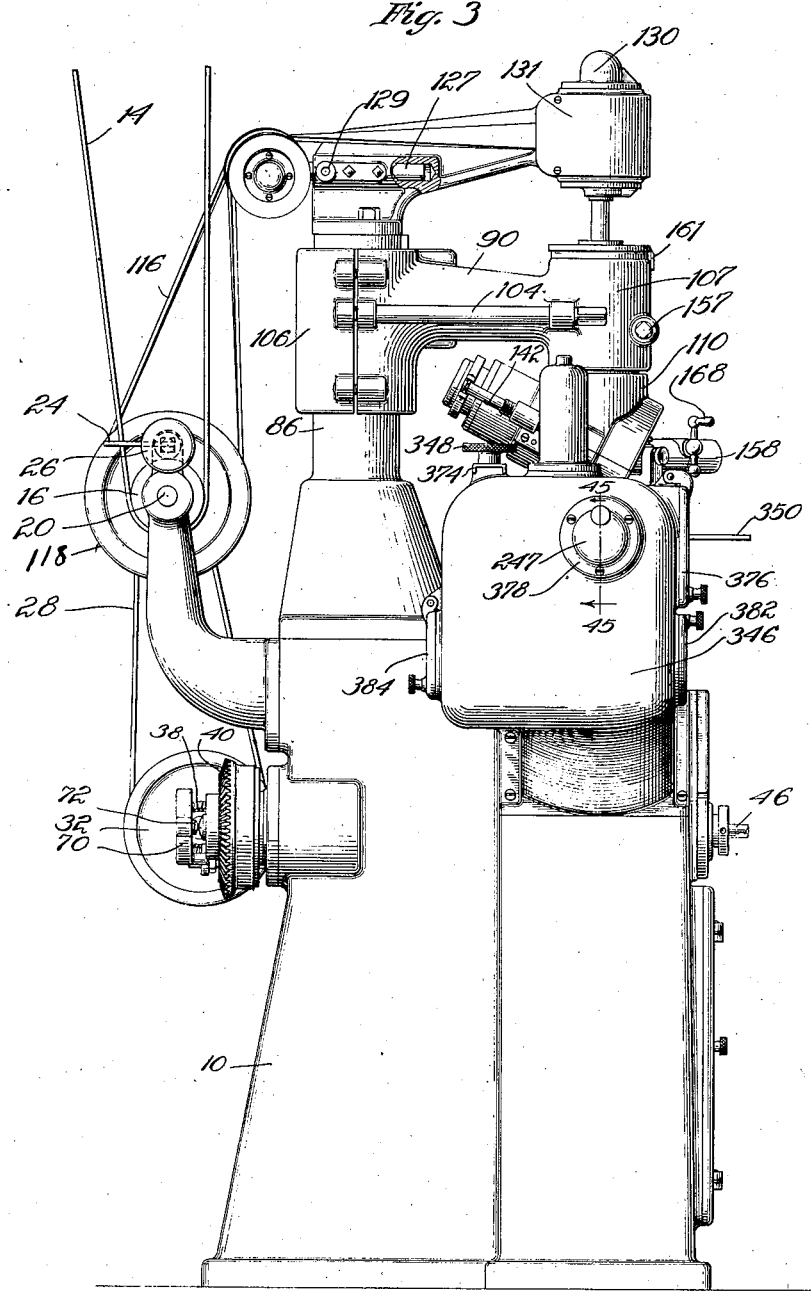
Figure 4:
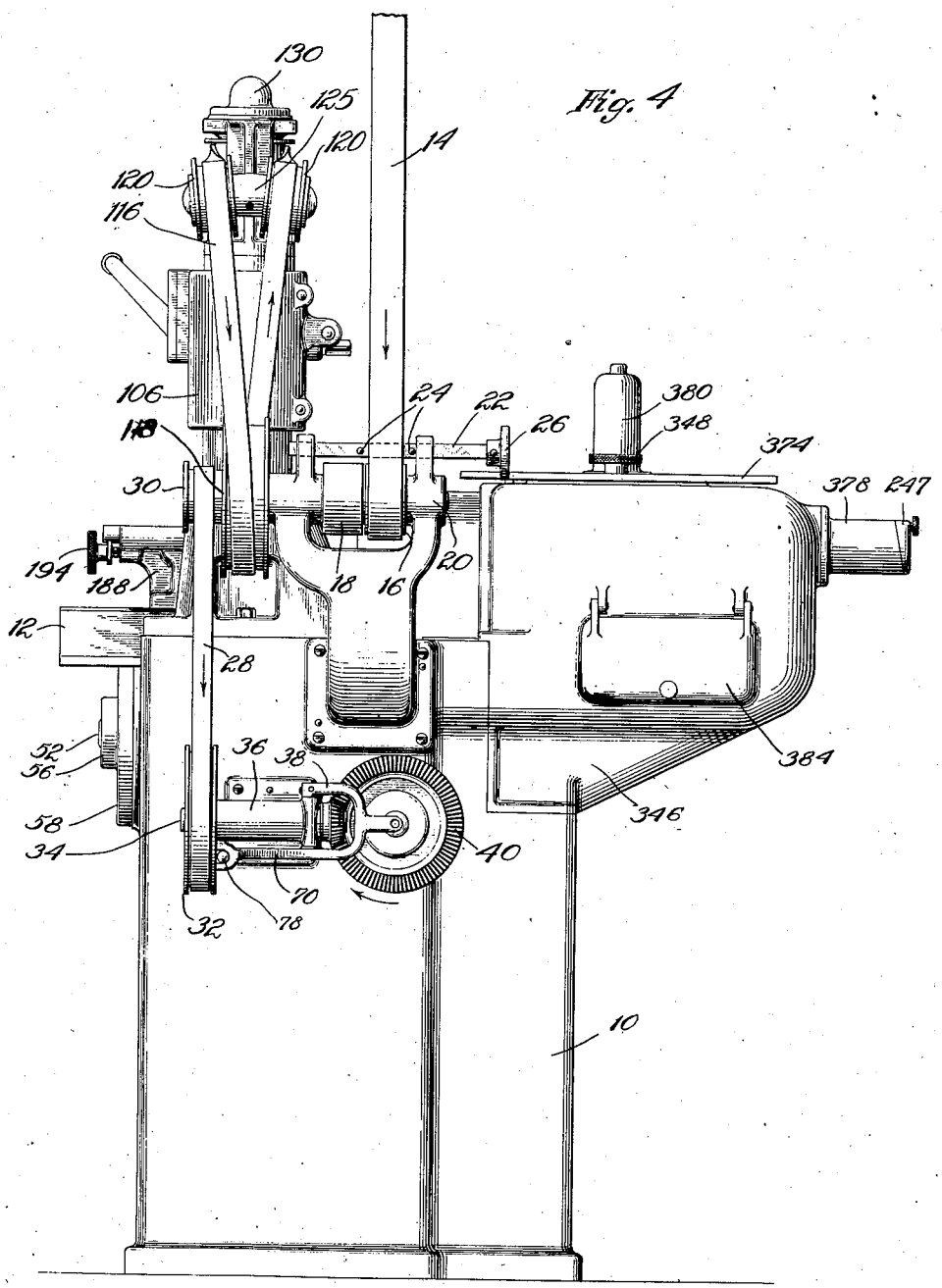

In the accompanying drawings, Figure 1 is a front elevation of a complete machine embodying the principles of my invention. Fig. 2 is an elevation of the right hand or tail stock end of the machine. Fig. 3 is an elevation of the left hand or head stock end, and Fig. 4 is a rear view.

Figure 5:
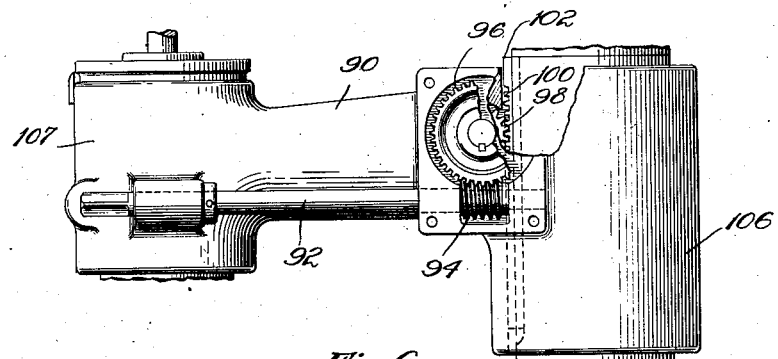
Figure 6:
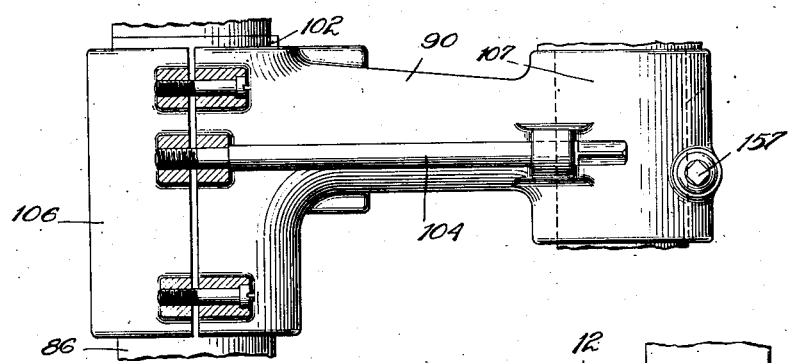
Figure 7:
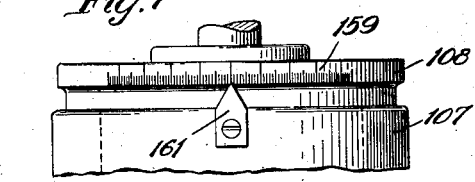
Figure 8:
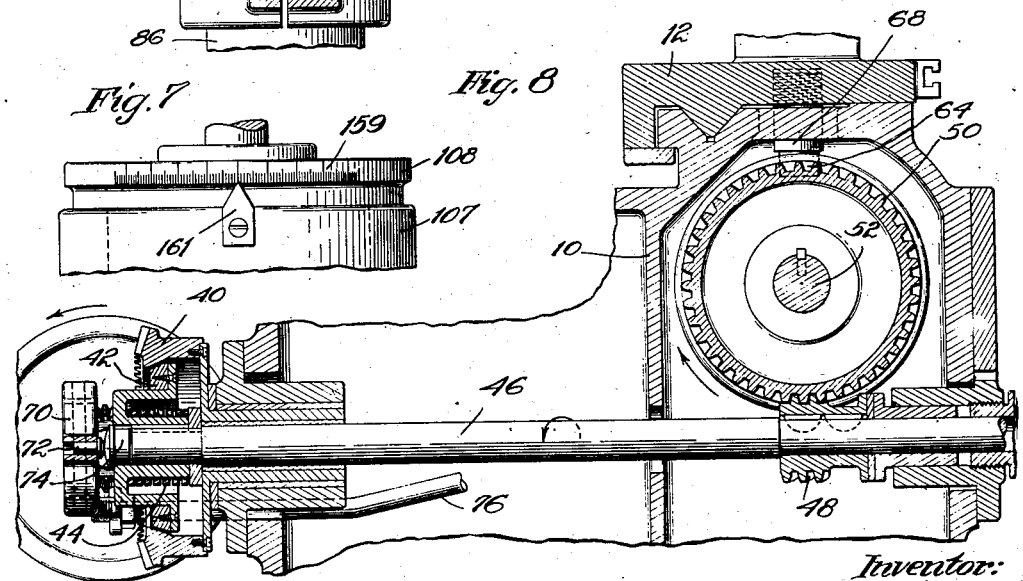
Figure 9:
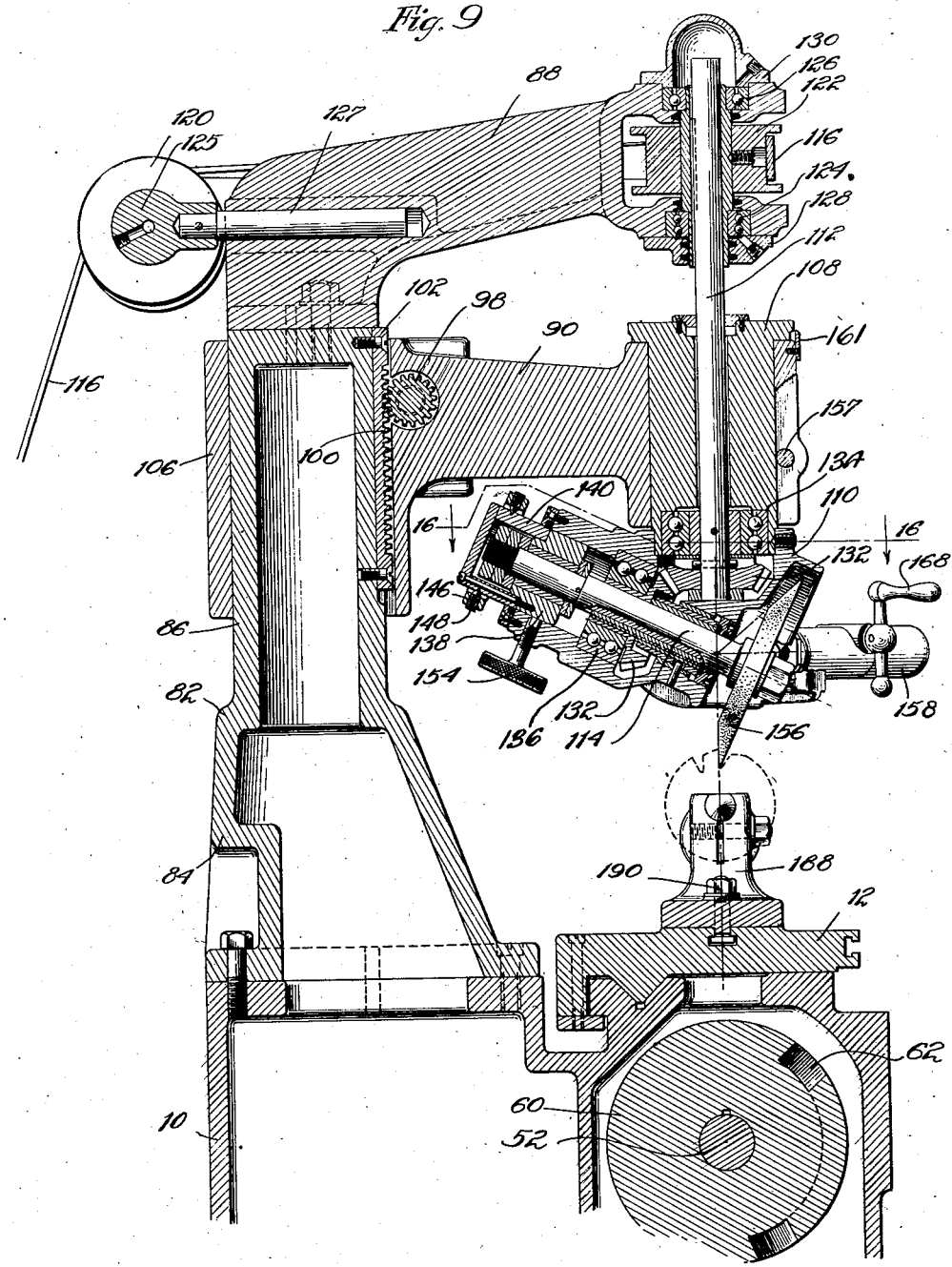

Figs. 5 and 6 are enlarged views of opposite sides of the wheel head carrying arm showing the means for adjusting the arm and clamping the parts in place. Fig. 7 is an enlarged detail of the front part of the wheel head arm showing the means for measuring the angular setting of the wheel head to take care of the lead. Fig. 8 is a vertical section showing the transmission to the drum for reciprocating the table. Fig. 9 is a vertical section on line 9—9 of Fig. 1, showing the wheel head and its supporting means and also part of the table and base. Fig. 10 is a vertical section on line 10 of Fig. 1 illustrating the control means for the power transmission to reciprocate the table. Fig. 11 is a detail view of a table stop dog. Fig. 12 is a section on line 12—12 of Fig. 2 of the idler pulleys forming part of the grinding wheel drive. Fig. 13 is a longitudinal vertical section on line 13—13 of Fig. 2 illustrating the means for reciprocating the table. Fig. 14 is a detail of the table drive cam and its connection with the table. Fig. 15 is an enlarged detail of the yoke for controlling the transmission of power to the table.

Fig. 16 is a view looking downwardly at the wheel carrying head. Fig. 17 is a sectional detail of the dressing tool on the line 17—17 of Fig. 18. Fig. 18 is a section through the same parts on the line 18—18 of Fig. 16. Fig. 19 is a section on the line 19—19 of Fig. 18. Fig. 20 is an enlarged side elevation of the wheel carrying head. Fig. 21 is a section on line 21—21 of Fig.

20. Fig. 22 is a section on line 22—22 of Fig. 17 and Fig. 23 is an end view of the parts shown in Fig. 22.

Fig. 24 is a head stock end elevation of the operating parts, the casing being shown in section. Fig. 25 is a plan view of the same parts in section on line 25—25 of Fig. 24, the casing being omitted. Fig. 26 is a vertical section on line 26—26 of Fig. 25. Fig. 27 is a vertical section on line 27—27 of Fig. 26. Fig. 28 is a longitudinal vertical section on line 28—28 of Fig. 24. Fig. 29 is an enlarged front elevation of part of the feeding and indexing means and Fig. 30 is a similar elevation from the rear side. Figs. 31, 32 and 33 are enlarged views of the main parts of the feeding and indexing mechanism illustrating three consecutive steps in the operation of the device and Fig. 34 shows the final position completed with the parts disengaged ready for the next series of movements. Figs. 35 and 36 are plan views partly in section illustrating the automatic means for withdrawing the indexing pin during the operations illustrated in Figs. 31 and 34.

Figure 37:
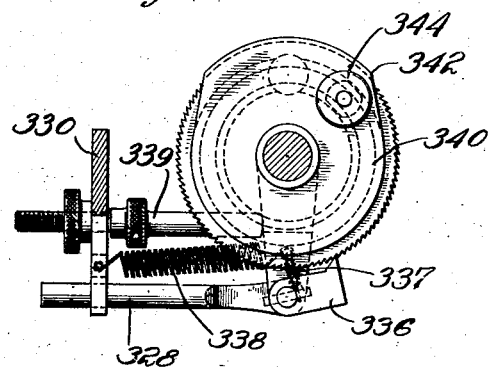
Figure 38:
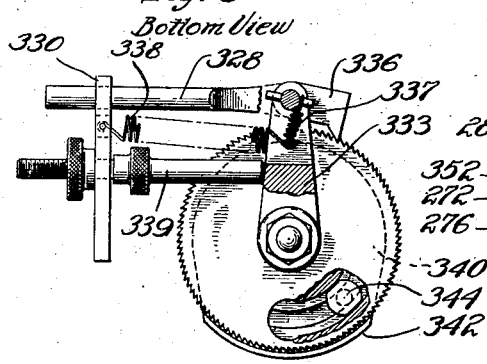
Figure 39:
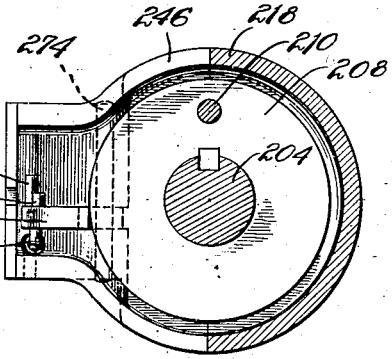
Figure 40:
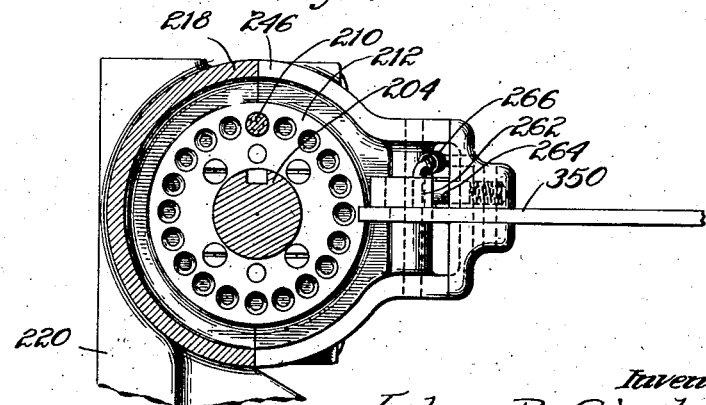
Figure 46:
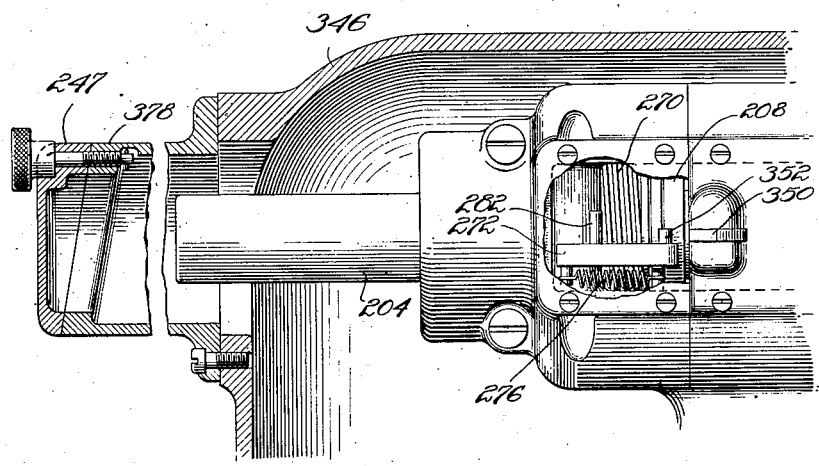
Figure 47:
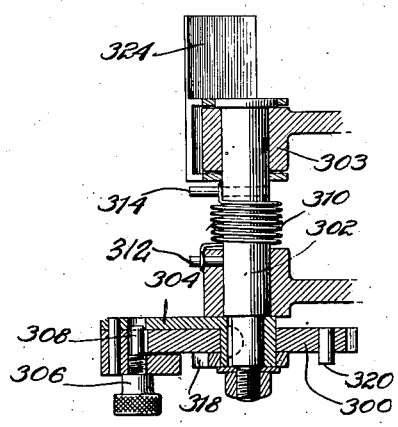

Fig. 37 is a section on line 37—37 of Fig. 27 and Fig 38 is a bottom view looking upward at the same parts. Figs. 39 and 40 are sections looking in opposite directions on lines 39—39, 40—40 of Fig. 25. Fig. 41 is a detail section of the connection between the spindle extension and the feeding and indexing means, and Fig. 42 is a similar section illustrating the method of operating the parts manually instead of automatically. Figs. 43, 44 and 45 are sections on lines 43—43, 44—44, and 45—45, respectively, of Fig. 28. Fig. 46 is a section through the dustguard and cover cut away to show the catch for the index pin sleeve. Fig. 47 is a detail section of the feed counting ratchet on line 47—47 of Fig. 28.

The functions of the machine selected as an illustration of my invention may be conveniently divided into three parts: First, a work-carrying table and means for supporting and guiding it and for moving it to and fro with a reciprocatory movement. Second, a grinding wheel so mounted that it may be readily adjusted for proper presentation to the cutter to be ground or sharpened; this part of the device includes this cludes in this instance a wheel dressing arrangement for dressing the wheel to its correct shape in its final position of adjustment just before the grinding operation. Third, means for imparting to the work a movement or rotation proportionate to its movement of translation, an additional intermittent movement superposed on the first mentioned movement for indexing the cutter and still another movement superposed on the first two movements for feeding the tooth cutter toward the wheel. I also employ in the third part of the machine automatic means for stopping the automatic feed after a predetermined movement.

Referring first to Figs. 1-4, inclusive, there is illustrated a main frame or casting 10 forming the body of the machine and supporting all the various brackets and casings for supporting and housing the moving parts. A table 12 is supported on the frame 10 by suitable ways for reciprocatory sliding movement thereon. These means comprise in this instance a belt 14 which may for the present purpose be considered a source of power adapted to run over either of two pulleys 16 and 18 one of which is fast to the shaft 20 and the other of which is loose. A slidable rod 22 equipped with belt engaging fingers 24 and a head 26 for manual operation may be employed to shift the belt. From the shaft 20 a belt 28 running over pulleys 30 and 32 transmits power to the horizontal shaft 34 journalled in a bracket 36 on the rear side of the frame 10 and carrying a bevel pinion 38 (see Fig. 4). This pinion meshes continuously with a bevel gear 40 (see Figs. 8 and 15). A cone clutch 42 is normally held in frictional engagement with the cooperating interior conical surface of the bevel gear 40 by means of compression spring 44 and when thus in contact transmits power through shaft 46 to which it is keyed, spiral pinion 48 also keyed to shaft 46 and spiral gear 50, to a longitudinal shaft 52 extending beneath the table parallel thereto. Shaft 52 (see Fig. 13) is suitably journalled at one end in a bearing 54 and at the other end in another bearin 56 in a bearing plate 58 bolted to the side of the frame 10. Upon removal of the plate 58 the shaft and parts carried thereby may be readily disassembled. The shaft 52 carries a cylindrical drum or cam 60 having a groove 62 cut in it which groove receives a roller 64 on the end of a stud 66 pinned in a plug 68 threaded into the under side of the table 12. It will be apparent that as long as clutch 42 is in engagement and power is delivered to the machine the cam 60 will rotate and the table will be reciprocated.

Suitable means is provided (see Figs. 8, 10 and 15) for disconnecting the clutch 42 to interrupt the supply of power to reciprocate the table. A yoke 70 pivoted on a vertical axis on bracket 36 carries a pin 72 having a convex tip movable into engagement with a button 74 socketed in the clutch member 42. Upon rocking yoke 70 the pin will press against the button and move clutch 42 out of operative engagement with bevel gear 40. This position of the parts is illustrated in Fig. 8. The operation may be controlled from the front of the machine by means of push rod 76 engaging the yoke 70 at 78 and at its front end connected to the lower end of the control lever 80 which control lever carries at its upper end means for manual or automatic operation of the same to be hereinafter described.

Grinding wheel head.

A column 82 is stationarily bolted on the frame 10 and comprises a foot portion 84 (see Fig. 9), a cylindrical portion 86 and an overhanging arm 88. Upon the cylindrical portion 86 an arm 90 is mounted. The vertical position of the arm may be adjusted by means of shaft 92 (see Fig. 5) operating through worm 94, worm wheel 96, and pinion 98 meshing with rack teeth 100 on the same spline 102 which prevents the arm 90 from rotating with respect to the column. The arm may be clamped in vertical position by any suitable means such as that illustrated in Fig. 6 comprising a rod 104 operating to clamp the split collar 106 engaging the cylindrical portion 86 firmly thereto.

The arm 90 terminates in a support 107 for the sleeve 108 rotatable about a vertical axis, which sleeve in turn supports a casting 110 forming the grinding wheel head, and a vertical drive shaft 112 concentric with the sleeve. The casting 110 is rigidly bolted to the sleeve 108 and supports the grinding wheel shaft 114 at an angle to the horizontal, the axis of the grinding wheel shaft intersecting the vertical axis of sleeve 108 and its concentric drive shaft 112. Power may be transmitted to rotate the grinding wheel shaft by means of belt 116 passing over pulley 118 and over a pair of idler pulleys 120 near the top of the column to engage and drive a pulley 122 supported in the end of the overhanging arm 88 and splined to the shaft 112 so as to permit vertical adjustment of the same without interfering with the transmission of power. As illustrated in Fig. 12, the idler pulleys 120 are preferably supported on anti-friction bearings 123 and set at an appropriate angle to provide for the convergence of the downwardly extending portions of the belt 116. They are supported on a block 125 which in turn is mounted on the end of a plunger 127 seated in a tubular socket in the column 82. The plunger 127 may be moved in its socket to adjust the tension of belt 116 and clamped in position by means of suitable set screws 129. Pulley 122 is also preferably supported by anti-friction or ball bearings 124 and 126 covered and protected by retaining members 128 and 130. A shield 131 (see Fig. 3) is preferably employed, encircling the front portion of pulley 122 to protect the operator from tiny particles of dirt which might be thrown off by the belt or pulley. In the other figures of the drawings this shield has been omitted to permit the illustration of the parts covered thereby. The vertical shaft 112 and the grinding wheel shaft 114 carry cooperating bevel gears 132 by means of which the grinding shaft is driven and are also preferably provided with ball bearings at 134 and 136.

It is necessary to adjust grinding wheel shaft 114 parallel to its axis to compensate for wear on the grinding wheel and for cutting teeth with offset faces. Referring to Figs. 9 and 16, there is provided a sleeve member 138 fastened against longitudinal movement with respect to shaft 114 and another sleeve member 140 fastened to the sleeve member 138 to cover and protect the fastening between the first sleeve member and the shaft. The two sleeves may slide as a unit in the head casting 110. Fig. 16 illustrates means for making this adjustment comprising an adjusting screw 142 threaded through a bracket 144 and engaging one end of a lever 146 the other forked end of which supports pins 148 engaging sleeve 140. The central part of the lever is provided with the equivalent of a pivotal support by means of link 150 and the connection between screw 142 and the lever is by means of pintles 152 (see Figs. 16 and 3) entering a peripheral groove in the screw. After adjustment of the longitudinal position of the grinding wheel shaft 114, sleeve 138 may be firmly clamped in adjusted position by means of set screw 154.

Dressing means.

It will be apparent that a dressing point mounted for rectilinear movement toward and away from the point of intersection of the axes of shafts 112 and 114 along any element of the conical surface of the grinding wheel 156 will operate to correctly dress the grinding wheel. The dressing device illustrated in Figs. 16–23, inclusive, is entirely supported from the head casting 110 and its adjustment with respect to the grinding wheel will therefore be undisturbed by any of the necessary adjustments of the position of the casting, which may be set in any desired position and clamped by bolt 157, operating to contract the split support 107. By means of a scale 159 (see Fig. 7) and a pointer 161, on the sleeve and support, the adjustment may be readily made with proper precision. As illustrated, the dressing device is conveniently located in an out of the way position to dress the wheel along an approximately horizontal element of its conical face.

The barrel 158 furnishes a slidable support for the rod 160 carrying the diamond point 162, and may be moved to carry the point past the face of the wheel and dress it by means of rack teeth 164 cut in the rod and a pinion 166 meshing with the rack teeth and rotatable by means of handle 168. Means are provided for first setting the diamond point itself with precision in a line of motion passing through the point of intersection of the axes of shafts 112 and 114. This means comprises a bracket 170 rigidly and permanently fastened to the head casting 110 (see Fig. 21), which bracket carries at its end a gage element 172 threaded into the bracket so that its adjustment may be measured by means of graduations 174 on the head 176 employed for adjusting the gage and a pointer 178 for reading the graduations. After the gage 172 has been set with its flat end face in a plane containing the point of intersection of the axes of shafts 112 and 114 the gage may be clamped in position by means of clamping screw 179. This is the zero position and should be appropriately indicated on the head 176. The adjustment of this gage need not be disturbed unless it is desirable to cut the teeth with offset faces in which case the amount of offset may be determined and correctly measured by releasing clamping screw 179 and moving the gage backward or forward, as the case may be, measuring the distance by means of scale 174.

As the wheel wears away by reason of its contact with the cutter, shaft 114 may be slightly retracted from time to time and the wheel dressed by moving the diamond point across its face. Any wear on the diamond point may be compensated for by moving barrel 158 and the bracket 177 which supports it, on guideways 178 (see Fig. 21) provided therefor by means of adjusting screw 180.

Work mounting.

The cutter to be sharpened or ground is mounted on a suitable spindle extending parallel to the line of motion of the table. Referring to Figs. 1, 13 and 29, a support 182 rigidly mounted on the table provides a bearing for the socket 184 in which the rotatable spindle 186 may be clamped against sliding movement by any suitable or appropriate means. A suitable dead center is provided for supporting the projecting end of the spindle comprising a tail stock 188 clamped by a bolt 190 in adjusted position on the table 12. The tail stock carries a dead center 192 longitudinally adjustable by means of set screw 194 and clamped in adjusted position by means of the tightening bolt 196. The centers support the work by means of a suitable arbor 198.

The rear end of the spindle 186 passes through a hand index disk 200 keyed thereon and an index finger holder 202 rotatably mounted thereon, and has a tang entering a suitable socket in a spindle extension 204 (see Fig. 25). The spindle extension is splined to a sleeve 206 carrying an index pin plate 208 from which the index pin 210 (see Fig. 28) projects parallel to the axis of the spindle extension. This pin normally enters a socket in an index plate 212 permanently united with the sleeve 214 of an index gear 216 (Fig. 25) rotatably supported in a bearing 218 formed in the upper end of a bracket 220 bolted to the frame 10. It will be seen that when the index pin 210 is socketed in the index plate, the index gear 216, spindle extension 204, and spindle are all rigidly connected together for simultaneous rotary movement.

Spiral feed.

A rack 221 is vertically slidable through suitable ways 222 provided in the bracket 220, being retained in position by clamping strips 224 (see Figs. 24 and 25). A bracket 226 projects from the table 12 and carries a circular plate 228 vertically slidable in guideways 230 which plate in turn supports a cooperating plate 232 pivotally connected thereto by means of a pintle 234 (see Fig. 26), and capable of being clamped in position by means of clamping bolts 236. A channel shaped guideway 238 is carried by the loose plate 232 and receives a guide block 240 which is pivotally connected to the pin 242 rigidly mounted in and projecting from the rack 221. If the channel shaped guideway 238 is set at an angle the reciprocation of the table will produce the reciprocation of the rack up and down as the guide block 240 slides in the guideway in the movement of the latter relative to the rack. The rack will impart a movement of rotation to the index gear 216 and thus to the spindle extension 204, spindle 186 and cutter mounted thereon, and the movement of rotation will be at all times proportional to the movement of translation of the table and cutter so that the teeth of the cutter will be moved through true helical paths. The angle of the helix may be determined by the setting of plate 232 and a scale 243 (see Fig. 27) and pointer 244 are provided for conveniently setting the slide at any desired angle.

Indexing.

In addition to the spiral movement last described it is necessary when the cutter is out of engagement with the wheel to shift it over or index it to bring the next gash into register with the wheel and sharpen the faces of the next set of teeth. For this purpose the index plate 212 is provided with a plurality of sockets corresponding to the number of flutes or gashes in the cutter. By removing the front half 246 (see Figs. 24 and 26) of the split bearing 218 surrounding the indexing gear, and disconnecting the spindle extension 204 from the tang of the spindle 186, the cap 247 (see Fig. 46) may be opened and the spindle extension may be readily withdrawn so that the indexing gear 216 may be removed and another one substituted having an index plate 212 with the correct number of sockets to correspond to the cutter to be ground. Each index gear also carries a plurality of projections 248 corresponding in number to the number of sockets in its index plate.

The index finger holder 202 is connected to the hand index disk 200 by a spring 250 (see Fig. 25) which tends to separate the two parts and also to rotate the index finger holder in the direction of the arrows in Fig. 32 with respect to the hand index disk. The index finger holder and hand index disk carry cooperating ratchet teeth 252, as clearly shown in Figs. 31–36, inclusive, which teeth are prevented from slipping completely out of mesh by limiting the axial movement of the index finger holder. This is accomplished by means of a sleeve 254 fastened to the index finger holder, which sleeve has a flange 256 (see Figs. 32 and 33), restrained from longitudinal movement away from the hand index disk by retaining straps 258.

Referring now to Figs. 31–36, inclusive, the table and parts carried thereby may be moved rearwardly from the position shown in Fig. 31 until the index finger 260 engages with its bevel side the bevel side of one of the projections 248. Movement of the table further to the end of its stroke will bring the parts to the position shown in Fig. 33 in which the index finger has entered the triangular space between two of the projections and the index finger holder has also been forced longitudinally toward the hand index disk forcing ratchet teeth 252 into completely engaged position. A definite amount of rotation is thus imparted to the spindle with respect to the index gear 216 each time the table moves into the position illustrated in Fig. 33 and this relative rotation will be entirely independent of any other movement imparted to the index gear, such as the movement for feeding the cutter through a helical path imparted thereto by guideway 238.

To permit the shifting movement illustrated in Figs. 31–33 it is necessary to remove the index pin 210 from its socket. For this purpose a slide 262 is mounted in the bracket 220 (see Figs. 25, 29, 35 and 36). The rear end of this slide is normally pressed toward the spindle extension by a spring pressed plunger 264 socketed in the frame and also drawn longitudinally by a tension spring 266. As soon as the tip of the index finger has entered between the projections on the index gear to approximately the position shown in Figs. 32 and 35, the end of rod 268 (see Fig. 25) adjustably mounted on the support 182 comes into abutting contact with the end of slide 262. The corner of the slide immediately engages the index pin plate 208 and moves it rearwardly against the force of a compression spring 270 to the position shown in Fig. 35. A retaining catch 272 is pivoted at 274 and normally urged by a spring 276 (see Figs. 25 and 46) in a direction to engage the edge of the index pin plate 208. After the slide 262 has moved the index pin plate far enough to be engaged and held by the catch 272, it is deflected laterally by engagement of pin 278 with the lower side of a cam groove 280 in the slide, and moves on past the index plate toward the position shown in Fig. 36. During this movement the interengagement of the index finger with the index gear rotates the spindle and index pin plate from the position shown in Fig. 35 to that shown in Fig. 36. At the end of the movement of the table the end of slide 262 encounters a pin 282 on catch 272 and trips the catch, releasing the index pin plate 208 which immediately snaps back into the position indicated in Fig. 36. The strength of spring 270 is sufficient to force the index pin home and correct any slight errors in the amount of movement produced by the index finger 260.

*Automatic feed.*

Means is provided for automatically imparting an additional movement of rotation to the spindle after each complete revolution of the same to advance the teeth of the cutter toward the grinding wheel and remove additional material. Counting means is employed for this purpose, best illustrated in Figs. 24, 28, 33 and 47. A plunger 284 slidably mounted in the frame is normally held in the position illustrated in Fig. 28 by a compression spring 286 and carries a projecting contact point 288 having a limited amount of sliding movement in the plunger by reason of a pin 290 engaging a slot 292, and normally held in extended position as indicated in Fig. 28 by a spring 294. The outer end of the plunger carries a pivoted pawl 296 adapted upon actuation of the plunger to engage ratchet teeth 298 on counting ratchet 300 and rotate the same. At the end of each stroke of the table the end of the table will encounter contact point 288 and move the contact point and plunger into the positions shown in Fig. 33. It should be noted that the contact point has not been completely telescoped with the plunger and that the movement of the plunger under the combined actions of springs 286 and 294 will not be abrupt so as to jar or injure the parts.

The counting ratchet 300 is loosely mounted to rotate on the shaft 302 journalled in a support 303 fastened to bracket 220, to which shaft is firmly secured an arm 304 so shaped that a thumb screw 306 (see Fig. 47) may be used to enter its pin 308 between any two teeth of the ratchet and thereby force the ratchet to rotate with shaft 302. A spring 310 engaging pins 312 and 314 projecting from the fixed supporting structure and shaft 302, respectively, exerts a tendency to rotate the shaft and counting ratchet, which rotation is prevented by a spring pressed catch 316 (see Fig. 28). Upon each actuation of the pawl 296 by the movement of the table, the pawl will engage the ratchet teeth and force the ratchet to turn one tooth against the force of spring 310, the ratchet being held in its new position by catch 316.

A release arm 318 hangs freely on the shaft 302 and will, as the shaft and arm 304 rotate, come into contact with the arm and be forced to rotate up and to the right from the position shown in Fig. 28 until it is interposed between the catch 316 and the counting ratchet. When this occurs the counting ratchet under the action of spring 310 will rotate rapidly in the opposite direction until a pin 320 carried by the counting ratchet strikes the release arm 318 and knocks it away from in front of catch 316, allowing the catch to stop the counting ratchet in what may be designated the starting position. It will be evident that the number of table strokes necessary to move the counting ratchet until the release arm 318 covers catch 316 and permits a return to the initial position may be set to any desired number by shifting arm 304 with respect to the ratchet by means of screw 306.

The automatic cycle of movements thus provided is utilized to effect a feed movement of the spindle once at the end of each complete revolution of the spindle. This feed movement is transmitted to the spindle by means of shifting guideway 238 bodily in a vertical direction for which purpose the plate 228 is made vertically slidable in the guideways 230 on the bracket 226 and may be vertically adjusted by a screw 321 journalled in the bracket and engaging a nut 322 (see Fig. 26) carried by the plate.

Referring to Figs. 24, 27, 37 and 38, a feed arm 324 (see also Figs. 30 and 47) is loosely mounted to rotate upon shaft 302. The feed arm carries a pin 326 (see Fig. 24) which lies in the path of pin 314 on the shaft 302 so that as the shaft rotates pin 314 will engage pin 326 and rotate the feed arm into feeding position at the last stroke of the table prior to the return of the ratchet 300 to starting position. Upon the last stroke this feed arm will lie in the path of the rod 328 slidably supported by a bracket 330 depending from the end of bracket 226, said rod being at its other end pivotally connected with a pin 332 mounted in the end of a rotatable arm 333 (see Figs. 26 and 27). A pawl 336 is rigidly mounted on the top of pin 332 and normally held in engagement with ratchet teeth on a feed ratchet 334 by means of spring 337. Actuation of rod 328 when it encounters the stationary feed arm 324 will rotate the feed ratchet 334 which is keyed to screw 321 and raise the entire guide 238 to shift the spindle and cutter carried thereby slightly and force the grinding wheel to remove more material. This adjustment is superposed on but entirely independent of either the helical movement or indexing movements above described.

The rate of feed may be readily regulated by means of an adjustable rod 339 mounted in the bracket 330 and operating to limit the initial position to which arm 333 will be drawn back by spring 338 after the actuation of rod 328. The total amount of feed may also be limited to a predetermined amount by means of a guard 340 having a segmental lip 342 overlying the teeth of ratchet 334 and clamped in any desired position on the feed ratchet by means of thumb screw 344. It will be obvious that continued rotation of the feed ratchet 334 will bring the leading edge of the guard under the pawl 336 holding it out of contact with the ratchet and preventing further feed.

Hand operation.

The feed screw 321 (see Fig. 26) extends upwardly through the housing 346 and carries a knurled head 348 by means of which it may be manually actuated by the operator at any time.

The index finger 260 is pivotally mounted on a pintle 345 (see Fig. 25) and may be positioned as shown in that figure or rotated through 90° to project radially outward from the axis of the spindle in which position the finger will not engage projections 248 and is therefore inoperative. A leaf spring 347 makes contact with the square butt of the finger, or with the side of the finger when it is thrown out to hold it in either position.

For hand indexing, finger 260 is thrown out and spring 266 is disconnected so that there will be no return stroke of the slide 262. A hand lever 350 pivoted on a vertical axis may be swung to cause its inner end to engage the index pin plate 208 and move it back as clearly shown in Fig. 42 to release the spindle extension. When this is done the hand index disk 200 may be grasped and manually rotated.

The hand lever 350 engages a pin 352 on catch 272 to prevent it from holding the index pin plate 208 in retracted position.

When the work is to be indexed by hand, it is desirable to disconnect the source of power and stop the table each time it reaches the end of its travel toward the left as shown in Fig. 1. Referring to Fig. 11, a block 354 horizontally slidable in suitable ways on the front of the table 12 carries a tripping dog 356 held in either of two predetermined positions by spring pressed plunger 358 engaging notches 360 in the side of the dog member. The control lever 80 (see Fig. 10) for disconnecting clutch 42 carries at its upper end a horizontal terminal piece 362 pivoted on a horizontal pintle 364 which terminal piece is equipped with a handle 366 for manual operation. A spring pressed plunger 368 engages the inner end of the terminal member 362 to hold it normally in the position shown in Fig. 10, and a spring pressed catch 370 will enter a notch in the outer end of the terminal member. In Fig. 10, the parts are illustrated in the position in which clutch 42 is disconnected, dog 356 having engaged the terminal member 362 and forced it horizontally to the right, in which position it will be held by the catch 370. This stops the movement of the table at the left end of its stroke where the operator may conveniently index the cutter. After adjusting the cutter for the next stroke the operator may grasp handle 366 and rock the terminal member 362 upon its horizontal pintle, depressing its inner end below dog 356 and moving lever 80 to permit clutch 42 to again transmit power. The handle 366 may be immediately released and as soon as dog 356 returns at the end of the next stroke, the table will be again disconnected from its source of power as before. When the dog is not to be used it is merely moved up far enough to pass above terminal member 362, and will be held in elevated position by plunger 358.

Housing.

To protect the means for moving the cutter spirally and for indexing and feeding it, housing 346 is provided, completely enclosing all the operating parts involved except for the feed screw 320, the knurled handle of which projects upwardly through a slot 372 in the casing. A cover 374 overlies the slot 372 to exclude dirt. For setting up the machine, the door 376 in the front of the casing is thrown open, and upon movement of the table to its extreme right-hand position, as shown in Fig. 1, the parts illustrated in Fig. 27 will be moved out from behind the indexing gear where the plate 232 may be readily set to provide the proper lead angle. To facilitate withdrawal of the spindle extension 204 when the index gear is to be changed, the tubular extension 378 of the housing 346 carries the cap 247 (see Figs. 1 and 46) which may be readily withdrawn to permit removal of the spindle extension. The vertically reciprocating rack 220 is also accommodated by the tubular extension 380 extending vertically above the top of the housing 346. Removal of this extension is not necessary in the ordinary operation of the machine but it may be removed for the purpose of dismantling the machine.

Casing extension 380 has an oil hole 384 which may be closed by a suitable plug, and rack 221 has a cup-shaped depression 386 in its upper end. Passageways 388 and 390 (see Fig. 26) carry oil from the depression 386 to lubricate the ways 222 within which the rack slides, and another passageway 392 carries oil from the depression 386 to a chamber 394 at the end of pin 242. A passageway 396 in the pin 242 carries oil to the abutting surfaces of the pin and the plug 240 to lubricate the pivotal connection between them.

For convenient adjustment of the counting mechanism associated with ratchet 300, a door 382 is provided in the front of the housing, and for adjustment of the automatic feed and automatic feed stop, another door 384 is provided in the rear of the housing.

While I have illustrated and described in detail the preferred embodiment of my invention, it should be clearly understood that the disclosure is merely for purposes of illustration and that many modifications and variations will naturally occur to those skilled in the art. I aim in the subjoined claims to cover all such legitimate variations and modifications.

I claim as my invention:

1. In a cutter grinding machine, a cutter carrying element, an extension removably united with said element, means for reciprocating said element, a non-reciprocating indexing member having splined connection with said extension, means for rotating said indexing member in proportion to the reciprocation of the spindle, means for imparting an additional feed movement of rotation to said indexing member, means for producing an indexing movement between said indexing member and said extension, said last mentioned means including means projecting from said indexing member and corresponding in number to the number of indexing movements required for a complete revolution, and a split casing supporting said indexing member, whereby said member may be readily removed and replaced after removal of said extension.

2. A cutter grinder having, in combination, a cutter support, feeding means for automatically rotating the support once at the end of each rotation through a predetermined arc, to increase the amount of material removed from the cutter by the grinding element, means interpolated between the feeding means and the cutter support for rotating the cutter in proportion to its reciprocatory movement, and means for limiting the total amount of feed produced by said first mentioned rotating means.

3. A cutter grinder having, in combination, a reciprocatory cutter support, a first means for automatically rotating the support to increase the amount of material removed by the grinding element, a second means interpolated between said first means and the cutter support for rotating the support in proportion to its reciprocatory movement, and a third means interpolated between said second means and the cutter support for disconnecting the support from said second means, producing relative movement between the two to index the cutter, and again connecting the support to said second means, at the end of each complete oscillation of the support.

4. A cutter grinder having, in combination, a reciprocatory cutter support, indexing means for rotating said cutter support through an aliquot part of a revolution at the end of each complete oscillation thereof, counting means actuated once at the end of each complete oscillation of the support, means for adjusting said counting means to complete a cycle of operation once after each rotation of the support through a predetermined arc, feeding means automatically actuated by the completion of the cycle of operation of said counting means, and means manually adjustable to automatically limit the total amount of displacement produced by said feeding means.

5. A cutter grinder having, in combination, a spindle, a spindle extension sliding and rotating with said spindle, an index gear through which said spindle extension passes, means splined to said spindle extension and having operative engagement with said index gear to prevent relative rotation of said gear and spindle extension, and means for disconnecting said splined means from said index gear at the end of each complete oscillation of the spindle to rotate the spindle and its extension with respect to said index gear through an aliquot part of a revolution.

6. In a cutter grinding machine, in combination, a grinding wheel shaft, a wheel on said shaft having a convex conical grinding face, a mounting supporting said shaft and wheel, said mounting including a sleeve rotatable about an axis alined with an element of the conical surface of the wheel, a supporting means rotatably receiving said sleeve, means for clamping said sleeve in any desired position of adjustment in said support, and means to maintain the conical element in said axial alinement as the wheel is worn away.

7. In a cutter grinding machine, in combination, a grinding wheel shaft mounted for axial sliding movement, and means for adjusting said shaft axially and clamping it in adjusting position, said means comprising a lever having pivotal connection with one end of said shaft, a link connected to fixed support and to an intermediate point of said lever to provide a shiftable fulcrum for the same, and means engaging the remaining end of the lever for moving the lever.

8. In a device of the class described, a reciprocatory table, a rotatable spindle carried by said table, a rotatable element mounted in a fixed support, an element reciprocating with the table and connected with the spindle, said element having sliding engagement with said rotatable element, and means carried by the table for rotating said rotatable element proportionately to the reciprocatory movement of the table.

9. In a cutter grinding machine, a cutter carrying element, an extension removably united with said element, means for reciprocating said element, a non-reciprocating indexing member having splined connection with said extension, means for producing an indexing movement between said indexing member and said extension, said last mentioned means including means projecting from said indexing member and corresponding in number to the number of indexing movements required for a complete revolution, and a split casing supporting said indexing member, whereby said member may be readily removed and replaced after removal of said extension.

10. In a device of the class described, a reciprocatory table, a spindle carried by said table, means for rotating said spindle to move points on the surface thereof through helical paths, a second means superposed on and independent of said first mentioned means for intermittently rotating said spindle through predetermined displacements, a third means superposed on said first and second means and independent of both of them for automatically imparting an increment of rotary movement to the spindle once during each rotation of the spindle through a predetermined arc regardless of the number of table strokes required for completion of said arc of rotation, and a fourth means for automatically arresting the operation of said third means after a predetermined increment of rotation has been produced thereby.

11. A cutter grinder having, in combination, a cutter support, means for automatically rotating the support once at the end of each rotation through a predetermined arc to increase the amount of material removed from the cutter by the grinding element, and means interpolated between the feeding means and the cutter support for rotating the cutter in proportion to its reciprocatory movement.

12. In a cutter grinding machine, automatic indexing means comprising an element reciprocable with the cutter spindle, a non-reciprocable member having means corresponding in number to the number of indexing movements required for a complete revolution, and operative by engagement with said spindle carried element to rotate the spindle at the end of each reciprocation thereof through substantially the necessary arc, and a resilient lost motion connection permitting spiral movement of the spindle carried element with respect to the spindle, and taken up by movement of the spindle to the end of its path, whereby after the completion of one indexing movement, the spindle carried element will be offset slightly into position to engage the next indexing means.

13. A cutter grinder having, in combination, a reciprocatory cutter support, a non-reciprocatory element normally connected to the cutter support for rotation in unison therewith, means for manually disconnecting the cutter support from the element at any time for manually rotating the cutter support, and means for automatically disconnecting the element and the cutter support at the end of each oscillation of the support and for rotating the support with respect to the element through an aliquot part of a revolution and connecting it again to the element.

14. A cutter grinder having, in combination, a reciprocatory cutter support, means for manually indexing the cutter support, trip means for automatically disconnecting the cutter support from the source of power at the end of each oscillation, said trip means including elements resiliently held in operative position, and means for manually throwing said elements out of operative position to start the cutter support again, whereby at the end of the next oscillation the power will again be disconnected.

15. A cutter grinder having, in combination, a reciprocatory table, a source of power, a transmission from said source of power to said table, control connections for connecting and disconnecting said transmission, means carried by the table for engaging said control connections to disconnect the power at the end of each oscillation of the table, and means manually operative without disturbing the adjustment of the disconnecting means for removing the control element from the path of movement of the disconnecting means to deliver power to the table.

16. In a cutter grinding machine, a cutter carrying element, an extension removably united with said element, means for reciprocating said element, a non-reciprocating indexing member having splined connection with said extension, and a split casing supporting said indexing member, whereby said member may be readily removed and replaced after removal of said extension.

17. A cutter grinder having, in combination, a reciprocatory cutter support, a non-reciprocatory element normally connected to the cutter support for rotation in unison therewith, means for manually disconnecting the cutter support from the element at any time for manually rotating the cutter support, means for automatically disconnecting the element and the cutter support at the end of each oscillation of the support and for rotating the support with respect to the element through an aliquot part of a revolution and connecting it again to the element, and means for rendering said automatic means inoperative when said manual means is in use.

18. A cutter grinder having, in combination, a reciprocatory cutter support, manual means for indexing the cutter, and means for disconnecting the cutter support from the source of power at the end of each oscillation to permit indexing.

19. A cutter grinder having, in combination, a reciprocatory cutter support, means for manually indexing the cutter support, trip means for automatically disconnecting the cutter support from the source of power at the end of each oscillation, said trip means including elements resiliently held in operative position.

20. A cutter grinder having, in combination, a reciprocatory table, a source of power, a transmission from said source of power to said table, control connections for connecting and disconnecting said transmission, means carried by the table for engaging said control connections to disconnect the power at the end of each oscillation of the table, means manually operative without disturbing the adjustment of the disconnecting means for removing the control element from the path of movement of the disconnecting means to deliver power to the table, and resilient means for returning the control element to initial position.

21. A cutter grinder having, in combination, a spindle, an index gear, a splined connection between said gear and spindle, a vertical rack meshing with said index gear, a pin projecting from said vertical rack, a block pivotally mounted on the end of said pin, means for moving said block to actuate said rack, a casing enclosing said gear and parts associated therewith, an oil hole in said casing vertically over said rack, a depression in said rack to receive oil falling through said hole, and passageways within said rack for conducting said oil to lubricate the guiding surfaces for the rack and the pivotal connection between the pin and the block.

22. A cutter grinder having, in combination, a spindle, an index gear, a splined connection between said gear and spindle, a rack meshing with said index gear, a pin projecting from said rack, a block pivotally mounted on the end of said pin, and means for moving said block to actuate said rack.

23. A cutter grinder having, in combination, a reciprocatory spindle, a non-reciprocating indexing member, said indexing member having projections with beveled sides, an index finger having a beveled side, movement of said spindle toward said index member operating to insert said index finger between said projections.

24. A cutter grinder having, in combination, a reciprocatory spindle, a non-reciprocating indexing member, said indexing member having projections with beveled sides, an index finger having a beveled side, an index finger support, a member rigidly carried by said spindle, a spiral lost motion connection between said index finger support and said spindle carried member, movement of said spindle toward said index member operating to insert said index finger between said projections and to take up the lost motion between said finger support and said spindle carried member in one direction, and resilient means tending to move said finger support with respect to said spindle carried member in the other direction, whereby release of the parts by withdrawal of the spindle will operate to offset the index finger past the point of the next projection.

25. A cutter grinder having, in combination, a reciprocatory spindle, a non-reciprocating indexing member, said indexing member having projections with beveled sides, an index finger having a beveled side, an index finger support, a member rigidly carried by said spindle, a spiral lost motion connection between said index finger support and said spindle carried member, movement of said spindle toward said index member operating to insert said index finger between said projections and to take up the lost motion between said finger support and said spindle carried member.

26. A cutter grinder having, in combination, a reciprocatory spindle, a non-reciprocating indexing member, said indexing member having projections with beveled sides, an index finger having a beveled side, an index finger support, a member rigidly carried by said spindle, a lost motion connection between said index finger support and said spindle carried member, movement of said spindle toward said index member operating to insert said index finger between said projections and to take up the lost motion between said finger support and said spindle carried member in one direction, and resilient means tending to move said finger support with respect to said spindle carried member in the other direction.

27. A cutter grinder having, in combination, a reciprocatory table, a slide, a guideway carried by said table for movement past said slide, means projecting from said slide for engagement with said guideway, means for adjusting the inclination of said guideway, means for moving said guideway bodily parallel to the line of movement of said slide, a cutter support rotatably mounted on the table, means normally connecting the cutter support to the slide for rotation proportionally to the displacements of the slide, and means for disconnecting the cutter support from the slide moving it through an aliquot part of a revolution for indexing purposes and again connecting it to the slide.

28. A cutter grinder having, in combination, a reciprocatory table, a slide, a guideway carried by said table for movement past said slide, means projecting from said slide for engagement with said guideway, means for adjusting the inclination of said guideway, and means for moving said guideway bodily parallel to the line of movement of said slide.

29. A cutter grinder having, in combination, a reciprocatory table, a slide, a guideway carried by said table for movement past said slide, means projecting from said slide for engagement with said guideway, and means for adjusting the inclination of said guideway.

30. A cutter grinder having, in combination, a reciprocatory table, a slide, a guideway carried by said table for movement past said slide, means projecting from said slide for engagement with said guideway, means for adjusting the inclination of said guideway, means for moving said guideway bodily parallel to the movement of said slide, a cutter support rotatably mounted on the table, means normally connecting the cutter support to the slide for rotation proportional to the displacements of the slide, means for disconnecting the cutter support from the slide moving it through an aliquot part of a revolution for indexing purposes and again connecting it to the slide, counting means actuated once during each oscillation of the table and adjustable to complete a cycle of operation at the end of each rotation of the cutter support through a predetermined arc, and an operative connection between said counting means and said means for moving the guideway bodily.

31. A cutter grinder having, in combination, a reciprocatory table, a reciprocatory slide, a guideway carried by said table for movement past said slide, means projecting from said slide for engagement with said guideway, means for adjusting the inclination of said guideway, means for moving said guideway bodily parallel to the line of movement of said slide, a cutter support rotatably mounted on the table, means normally connecting the cutter support to the slide for rotation proportional to the displacements of the slide, means for disconnecting the cutter support from the slide moving it through an aliquot part of a revolution for indexing purposes and again connecting it to the slide, counting means actuated once during each oscillation of the table and adjustable to complete a cycle of operation at the end of each rotation of the cutter support through a predetermined arc, an operative connection between said counting means and said means for moving the guideway bodily, and automatic means for rendering said connection inoperative after a predetermined amount of bodily movement of said guideway has taken place.

32. A cutter grinder having, in combination, a reciprocatory table, a cutter support rotatably supported on said table, a reciprocatory element, means carried by said table for movement in a direction parallel to a line intersecting the line of movement of said reciprocatory element, means projecting from said reciprocatory element for engagement with said table carried means to impart to said element a movement of translation proportional to the movement of translation of the table, a connection between said reciprocatory element and the cutter support carrying means for rotating the cutter support in proportion to the movement of the reciprocatory element, and means for adjusting the table carried means to vary the ratio between the movements of the table and the reciprocatory element.

33. A cutter grinder having, in combination, a reciprocatory table, a cutter support rotatably supported on said table, a reciprocatory element, means carried by said table for movement in a direction parallel to a line intersecting the line of movement of said reciprocatory element, means projecting from said reciprocatory element for engagement with said table carried means to impart to said element a movement of translation proportional to the movement of translation of the table, a connection between said reciprocatory element and the cutter support carrying means for rotating the cutter support in proportion to the movement of the reciprocatory element, means for adjusting the table carried means to vary the ratio between the movements of the table and the reciprocatory element, and means for imparting to the reciprocatory element additional displacements independent of and superposed upon those produced by movement of the table.

34. A cutter grinder having, in combination, a reciprocatory table, a cutter support rotatably supported on said table, a reciprocatory element, means carried by said table for movement in a direction parallel to a line intersecting the line of movement of said reciprocatory element, means projecting from said reciprocatory element for engagement with said table carried means to impart to said element a movement of translation proportional to the movement of translation of the table, and a connection between said reciprocatory element and the cutter support carrying means for rotating the cutter support in proportion to the movement of the reciprocatory element.

35. A cutter grinder having, in combination, a reciprocatory table, a cutter support rotatably supported on said table, a reciprocatory element, means carried by said table for movement in a direction parallel to but offset from a line intersecting the line of movement of said reciprocatory element, means projecting from said reciprocatory element for engagement with said table carried means to impart to said element a movement of translation proportional to the movement of translation of the table, a connection between said reciprocatory element and the cutter support carrying means for rotating the cutter support in proportion to the movement of the reciprocatory element, means for adjusting the table carried means to vary the ratio between the movements of the table and the reciprocatory element, means for imparting to the reciprocatory element additional displacements independent of and superposed upon those produced by movement of the table, automatic means for disconnecting the cutter support from the reciprocatory element and rotating it through an aliquot part of a revolution for indexing, counting means actuated once during each oscillation of the table and adjustable to complete a cycle of operation once after each rotation of the cutter support through a predetermined arc, and an operative connection between said counting means and said means for producing additional displacements of the reciprocatory element.

36. In a cutter grinding machine, in combination, a grinding wheel shaft, a wheel on said shaft having a convex conical grinding face, a mounting supporting said shaft and wheel said mounting including a sleeve rotatable about an axis alined with an element of the conical surface of the wheel, a supporting means rotatably receiving said sleeve, means for clamping said sleeve in any desired position of adjustment in said support, means for moving said support parallel to the axis of said sleeve and for clamping it in adjusted position, a power transmission element extending through said sleeve along the axis thereof for driving said wheel, and means having splined engagement with said power transmission element for rotating the same.

37. In a cutter grinding machine, in combination, a grinding wheel shaft mounted for axial sliding movement, and means for adjusting said shaft axially and clamping it in adjusting position, said means comprising a lever having pivotal connection with one end of said shaft, a link connected to a fixed support and to an intermediate point of said lever to provide a shiftable fulcrum for the same, a screw-threaded plunger engaging the remaining end of the lever for moving the lever, and clamping means fixedly supported adjacent the shaft for engagement therewith to prevent axial sliding movement.

38. In a cutter grinding machine, a cutter carrying element, an extension removably united with said element, means for reciprocating said element, a non-reciprocating indexing member having splined connection with said extension, means for producing an indexing movement between said indexing member and said extension, a split casing supporting said indexing member, whereby said member may be readily removed and replaced after removal of said extension.

39. In a cutter grinding machine, in combination, a grinding wheel shaft, a wheel on said shaft having a convex conical grinding face, a mounting supporting said shaft and wheel said mounting including a sleeve rotatable about an axis alined with an element of the conical surfaces of the wheel, a supporting means rotatably receiving said sleeve, means for clamping said sleeve in any desired position of adjustment in said support, means for moving said support parallel to the axis of said sleeve and for clamping it in adjusted position, and a power transmission element extending through said sleeve along the axis thereof for driving said wheel.

40. In a cutter grinding machine, in combination, a grinding wheel shaft mounted for axial sliding movement, and means for adjusting said shaft axially, said means comprising a lever having pivotal connection with one end of said shaft, a link connected to a fixed support and to an intermediate point of said lever to provide a shiftable fulcrum for the same, and a screw-threaded plunger engaging the remaining end of the lever for moving the lever.

41. In a cutter grinding machine, in combination, a grinding wheel shaft, a wheel on said shaft having a convex conical grinding face, a mounting supporting said shaft and wheel said mounting including a sleeve rotatable about an axis alined with an element of the conical surface of the wheel, a supporting means rotatably receiving said sleeve, means for clamping said sleeve in any desired position of adjustment in said support, means for moving said support parallel to the axis of said sleeve and for clamping it in adjusted position.

42. In a cutter grinding machine, in combination, a grinding wheel shaft mounted for axial sliding movement, and means for adjusting said shaft axially and clamping it in adjusting position, said means comprising a lever having pivotal connection with one end of said shaft, a link connected to a fixed support and to an intermediate point of said lever to provide a shiftable fulcrum for the same, and a longitudinally movable plunger engaging the remaining end of the lever for moving the lever.

43. In a cutter grinding machine, means for reciprocating a cutter and for feeding the faces of the cutter teeth toward a grinding wheel, said feeding means including automatic mechanism operating intermittently to feed the cutter, a casing inclosing said automatic mechanism, and means projecting outside said casing for feeding the cutter manually.

44. In a cutter grinding machine, means for reciprocating a cutter and for feeding the faces of the cutter teeth toward a grinding wheel, said feeding means including automatic mechanism operating intermittently to feed the cutter, a casing inclosing said automatic mechanism, and means projecting outside said casing and connected to an intermediate element of said feeding means for feeding the cutter manually.

45. In a cutter grinding machine, automatic indexing means comprising, in combination, an indexing member rigidly held against reciprocation, cutter carrying and rotating means having telescopic engagement with said indexing member, means splined on said cutter carrying and rotating means and normally resiliently held against rotation with respect to said indexing member, a release element and a second indexing member reciprocating with the cutter carrying means, and operating by reciprocation of the release element to release the splined element from the first indexing element, continued reciprocation of the cutter-carrying means moving the second indexing member into engagement with the first indexing member to produce relative movement between the cutter and the first indexing element, and still further reciprocation operating to move said releasing means into inoperative position to permit said splined means to snap back into engagement with said first indexing means.

46. In a cutter grinding machine, automatic indexing means comprising an element reciprocable with the cutter spindle, a non-reciprocable member having means corresponding in number to the number of indexing movements required for a complete revolution, and operative by engagement with said spindle carried element to rotate the spindle at the end of each reciprocation thereof through substantially the necessary arc.

47. In a cutter grinding machine, automatic indexing means comprising, in combination, a rotatable index member rigidly mounted against reciprocation, cutter carrying and rotating means having telescopic engagement with said indexing member, means having splined connection with said cutter carrying and rotating means and normally resiliently held in a position locked against rotation with respect to said indexing member, a release element reciprocating with the cutter carrying means, a second indexing member having a resilient lost motion connection with the cutter carrying means permitting spiral movement with respect thereto, release mechanism for releasing said splined member from said first indexing member and means for throwing said release mechanism into inoperative position at an intermediate point in its stroke, the release element and the second indexing element being so located that the following operations occur in the order specified: first, the releasing mechanism releases the splined member from the first indexing member; second, the first and second indexing members engage to rotate the cutter carrying means with respect to the first indexing member; and third, the longitudinal movement of the cutter carrying means to the end of its path takes up the lost motion between said means and the second indexing member, and the release mechanism is thrown into inoperative position permitting said splined element to be again locked to the first indexing member.

48. In a cutter grinding machine, automatic indexing means comprising, in combination, a rotatable index member rigidly mounted against reciprocation, cutter carrying and rotating means having telescopic engagement with said indexing member, means having splined connection with said cutter carrying and rotating means and normally resiliently held in a position locked against rotation with respect to said indexing member, a release element reciprocating with the cutter carrying means, a second indexing member having a resilient lost motion connection with the cutter carrying means permitting spiral movement with respect thereto, release mechanism for releasing said splined member from said first indexing member and means for throwing said release mechanism into inoperative position at an intermediate point in its stroke, the release element and the second indexing element being so located that the following operations occur in the order specified: first, the releasing mechanism releases the splined member from the first indexing member; second, the first and second indexing members engage to rotate the cutter carrying means with respect to the first indexing member; third, the longitudinal movement of the cutter carrying means to the end of its path takes up the lost motion between said means and the second indexing member, and the release mechanism is thrown into inoperative position permitting said splined element to be again locked to the first indexing member; and fourth, on the next movement of the cutter carrying means the lost motion connection shifts the second indexing member with respect to the cutter carrying means into position for the next cycle of operations.

49. In a cutter grinding machine, automatic indexing means comprising, in combination, a rotatable index member rigidly mounted against reciprocation, cutter carrying and rotating means having telescopic engagement with said indexing member, means having splined connection with said cutter carrying and rotating means and normally resiliently held in a position locked against rotation with respect to said indexing member, a release element reciprocating with the cutter carrying means, a second indexing member having a resilient lost motion connection with the cutter carrying means permitting spiral movement with respect thereto, release mechanism for releasing said splined member from said first indexing member, and means for throwing said release mechanism into inoperative position at an intermediate point in its stroke.

50. In a cutter grinding machine, in combination, a slidable and rotatable cutter carrier, a rotatable but non-slidable indexing member normally connected to said cutter carrier to control the rotation thereof, means for rotating said indexing member in proportion to the reciprocation of the cutter carrier, means for varying the rate of rotation of the indexing member, means for imparting an additional movement of rotation to the indexing member to feed the faces of the cutter teeth toward the grinding wheel, and means for intermittently producing an indexing movement between the indexing member and the cutter carrier without at any time completely disconnecting the two or interfering with the operation of said other means for rotating the indexing member.

51. In a cutter grinding machine, in combination, a slidable and rotatable cutter carrier, a rotatable but non-slidable index member normally connected to said cutter carrier to control the rotation thereof, means for rotating said indexing member in proportion to the reciprocation of the cutter carrier, means for varying the rate of rotation of the indexing member, and means for intermittently producing an indexing movement between the indexing member and the cutter carrier without at any time completely disconnecting the two or interfering with the operation of said other means for rotating the indexing member.

52. In a cutter grinding machine, in combination, a slidable and rotatable cutter carrier, a rotatable but non-slidable index member normally connected to said cutter carrier to control the rotation thereof, means for imparting an additional movement of rotation to the indexing member to feed the faces of the cutter teeth toward the grinding wheel, and means for intermittently producing an indexing movement between the indexing member and the cutter carrier without at any time completely disconnecting the two or interfering with the operation of said other means for rotating the indexing member.

53. In a cutter grinding machine, in combination, a slidable and rotatable cutter carrier, a rotatable but non-slidable index member normally connected to said cutter carrier to control the rotation thereof, means for rotating said indexing member in proportion to the reciprocation of the cutter carrier, means for imparting an additional movement of rotation to the indexing member to feed the faces of the cutter teeth toward the grinding wheel, and means for intermittently producing an indexing movement between the indexing member and the cutter carrier without at any time completely disconnecting the two or interfering with the operation of said other means for rotating the indexing member.

In testimony whereof, I have hereunto set my hand.

JOHN B. SINDERSON.